United States Patent
Kuribayashi

(10) Patent No.: US 10,623,625 B2
(45) Date of Patent: Apr. 14, 2020

(54) FOCUSING CONTROL DEVICE, IMAGING DEVICE, FOCUSING CONTROL METHOD, AND NONTRANSITORY COMPUTER READABLE MEDIUM

(71) Applicant: FUJIFILM Corporation, Tokyo (JP)

(72) Inventor: Kosuke Kuribayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 24 days.

(21) Appl. No.: 16/011,646

(22) Filed: Jun. 19, 2018

(65) Prior Publication Data

US 2018/0299645 A1 Oct. 18, 2018

Related U.S. Application Data

(63) Continuation of application No. PCT/JP2016/082693, filed on Nov. 2, 2016.

(30) Foreign Application Priority Data

Dec. 22, 2015 (JP) .................. 2015-249617

(51) Int. Cl.
*H04N 5/232* (2006.01)
*H04N 5/225* (2006.01)
(Continued)

(52) U.S. Cl.
CPC .......... *H04N 5/23212* (2013.01); *G02B 7/04* (2013.01); *G02B 7/08* (2013.01); *G02B 7/36* (2013.01);
(Continued)

(58) Field of Classification Search
None
See application file for complete search history.

(56) References Cited

U.S. PATENT DOCUMENTS

2010/0232646 A1 9/2010 Takeuchi
2014/0071318 A1 3/2014 Akamatsu et al.
(Continued)

FOREIGN PATENT DOCUMENTS

JP 2007011054 1/2007
JP 2008187332 8/2008
(Continued)

OTHER PUBLICATIONS

FUJIFILM Corporation, "The FUJIFILM X-T10: a stunning addition to the X series", published on May 15, 2018, retrieved from the Internet <URL: http://www.fujifilm.com/news/n150518_01.html?_ga=2.55351586.889515449.1539940958-256704817.1539940958> [retrieved on Oct. 19, 2018].
(Continued)

*Primary Examiner* — Mark T Monk
(74) *Attorney, Agent, or Firm* — JCIPRNET

(57) ABSTRACT

A focusing control device includes: a focusing position determination unit that determines a focusing position of a focus lens based on captured image signals acquired through imaging using a setting area selected among a plurality of setting areas set for an imaging surface of an imaging element that images a subject through an imaging optical system including the focus lens capable of moving in an optical axis direction; a subject distance information calculation unit as defined herein; a first evaluation unit as defined herein; and a second evaluation unit as defined herein, and the focusing position determination unit selects a setting area to be used in the determination of the focusing position, among the plurality of setting areas, based on an evaluation result using the first evaluation unit and an evaluation result using the second evaluation unit.

10 Claims, 13 Drawing Sheets

(51) Int. Cl.
- *H04N 5/369* (2011.01)
- *G03B 13/36* (2006.01)
- *G02B 7/08* (2006.01)
- *G02B 7/36* (2006.01)
- *G02B 7/04* (2006.01)

(52) U.S. Cl.
CPC ........... *G03B 13/36* (2013.01); *H04N 5/2254* (2013.01); *H04N 5/23293* (2013.01); *H04N 5/232122* (2018.08); *H04N 5/232127* (2018.08); *H04N 5/36961* (2018.08)

(56) References Cited

U.S. PATENT DOCUMENTS

| | | | |
|---|---|---|---|
| 2015/0334289 A1* | 11/2015 | Yoshino | A61B 1/00188 348/353 |
| 2016/0110604 A1 | 4/2016 | Yoneyama | |

FOREIGN PATENT DOCUMENTS

| | | |
|---|---|---|
| JP | 2010226709 | 10/2010 |
| JP | 2012085090 | 4/2012 |
| JP | 2014056032 | 3/2014 |
| JP | 2014155040 | 8/2014 |
| JP | 2015015592 | 1/2015 |

OTHER PUBLICATIONS

"International Search Report (Form PCT/ISA/210) of PCT/JP2016/082693," dated Jan. 31, 2017, with English translation thereof, pp. 1-5.

"International Preliminary Report on Patentability (Form PCT/IPEA/409) of PCT/JP2016/082693," dated Jul. 12, 2017, with English translation thereof, pp. 1-7.

* cited by examiner

FOCUSING CONTROL DEVICE, IMAGING DEVICE, FOCUSING CONTROL METHOD, AND NONTRANSITORY COMPUTER READABLE MEDIUM

CROSS REFERENCE TO RELATED APPLICATION

This is a continuation of International Application No. PCT/JP2016/082693 filed on Nov. 2, 2016, and claims priority from Japanese Patent Application No. 2015-249617 filed on Dec. 22, 2015, the entire disclosures of which are incorporated herein by reference.

BACKGROUND OF THE INVENTION

1. Field of the Invention

The present invention relates to a focusing control device, an imaging device, a focusing control method, and a computer readable medium storing a focusing control program.

2. Description of the Related Art

In recent years, with an increase in resolution of imaging elements, such as a charge coupled device (CCD) image sensor and a complementary metal oxide semiconductor (CMOS) image sensor, there has been a rapid increase in demand for information devices having an imaging function, such as a digital still camera, a digital video camera, a mobile phone such as a smartphone, and a personal digital assistant (PDA). The information devices having an imaging function described above are referred to as imaging devices.

As the imaging device, there is an imaging device that performs subject tracking auto focus (AF) for continuing to focus on a moving subject by tracking the moving subject.

For example, in the imaging device that performs the subject tracking AF, in a case where a subject image desired to be focused is specified by a user on a live view image, a tracking target area in which the specified subject image is present is searched for on each captured image data. A focusing position is determined based on image data within the searched tracking target area.

JP2010-226709A describes an imaging device that extracts similar areas similar to a subject image specified by a user from captured image data, and determines a tracking target area among a plurality of similar areas based on a movement vector in each of the plurality of areas within the captured image data in a case where there is the plurality of similar areas.

JP2012-085090A describes an imaging device that selects an optimum method among a method of acquiring a tracking target area based on color information of captured image data, a method of acquiring the tracking target area through block matching of the captured image data, and a method of acquiring the tracking target area based on a result of the color information and the block matching, based on information of a subject image as a tracking target candidate acquired from the color information of the captured image data.

JP2014-155040A describes an imaging device that searches for a tracking target area from captured image data based on color information of a specified subject image.

JP2007-011054A describes an imaging device that calculates contrast information for each of a plurality of areas set for captured image data, and detects movements of a focused subject image depending on a changed state of the contrast information of each area.

SUMMARY OF THE INVENTION

In the imaging device described in JP2010-226709A, in a case where the focused subject does not move and the movement vector of each of the plurality of areas within the captured image data is not changed, one of the plurality of similar areas is not able to be determined as the tracking target area. There is a possibility that the similar areas will be erroneously extracted due to a change in orientation of the focused subject.

In the imaging device described in JP2012-085090A, in a case where the color information of the subject image is changed due to the change in orientation of the subject and the focused subject does not move, one tracking target area is not able to be determined among the candidates of the plurality of tracking target areas.

In the imaging device described in JP2014-155040A, in a case where the orientation of the focused subject is changed, since the color information of the subject image is changed, there is a possibility that the tracking target area will be erroneously detected or the tracking target area will not be able to be determined.

In the imaging device described in JP2007-011054A, in a case where the focused subject does not move but a subject different from the subject suddenly appears in an imaging range, the contrast information is greatly changed in the different subject portion. Thus, there is a possibility that it will be erroneously determined that the subject moves, and there is a possibility that focusing accuracy will be deteriorated.

The present invention has been made in view of such circumstances, and an object of the present invention is to provide a focusing control device, an imaging device, a focusing control method, and a focusing control program which are capable of performing subject tracking AF for continuing to focus on a desired subject with high accuracy.

A focusing control device according to the present invention comprises a focusing position determination unit that determines a focusing position of a focus lens based on captured image signals acquired through imaging using a setting area selected among a plurality of setting areas set for an imaging surface of an imaging element that images a subject through an imaging optical system including the focus lens capable of moving in an optical axis direction, a subject distance information calculation unit that calculates first subject distance information of the subject formed in the setting area for each of the plurality of setting areas based on first captured image signals acquired by imaging the subject using the imaging element, a first evaluation unit that evaluates each of the plurality of setting areas based on second subject distance information in a focusing state at the time of second imaging performed earlier than time when first imaging for acquiring the first captured image signals is performed and the first subject distance information for each of the plurality of setting areas calculated by the subject distance information calculation unit, and a second evaluation unit that evaluates each of the plurality of setting areas based on the first captured image signal and a partial image signal which is acquired through imaging using a first setting area used in determination of the focusing position of the focus lens at the time of the second imaging, among second captured image signals acquired through the second imaging. The focusing position determination unit selects a setting area to be used in the determination of the focusing position, among the plurality of setting areas, based on an evaluation result using the first evaluation unit and an evaluation result using the second evaluation unit.

An imaging device according to the present invention comprises an imaging element that images a subject through an imaging optical system including a focus lens capable of moving in an optical axis direction, and the focusing control device.

A focusing control method according to the present invention comprises a focusing position determination step of determining a focusing position of a focus lens based on captured image signals acquired through imaging using a setting area selected among a plurality of setting areas set for an imaging surface of an imaging element that images a subject through an imaging optical system including the focus lens capable of moving in an optical axis direction, a subject distance information calculation step of calculating first subject distance information of the subject formed in the setting area for each of the plurality of setting areas based on first captured image signals acquired by the imaging element that images the subject, a first evaluation step of evaluating each of the plurality of setting areas based on second subject distance information in a focusing state at the time of second imaging performed earlier than time when first imaging for acquiring the first captured image signals is performed and the first subject distance information for each of the plurality of setting areas calculated in the subject distance information calculation step, and a second evaluation step of evaluating each of the plurality of setting areas based on the first captured image signal and a partial image signal which is acquired through imaging using a first setting area used in determination of the focusing position of the focus lens at the time of the second imaging, among second captured image data acquired through the second imaging. In the focusing position determination step, a setting area to be used in the determination of the focusing position is selected among the plurality of setting areas based on an evaluation result in the first evaluation step and an evaluation result in the second evaluation step.

A focusing control program according to the present invention causes a computer to perform a focusing position determination step of determining a focusing position of a focus lens based on captured image signals acquired through imaging using a setting area selected among a plurality of setting areas set for an imaging surface of an imaging element that images a subject through an imaging optical system including the focus lens capable of moving in an optical axis direction, a subject distance information calculation step of calculating first subject distance information of the subject formed in the setting area for each of the plurality of setting areas based on first captured image signals acquired by the imaging element that images the subject, a first evaluation step of evaluating each of the plurality of setting areas based on second subject distance information in a focusing state at the time of second imaging performed earlier than time when first imaging for acquiring the first captured image signals is performed and the first subject distance information for each of the plurality of setting areas calculated in the subject distance information calculation step, and a second evaluation step of evaluating each of the plurality of setting areas based on the first captured image signal and a partial image signal which is acquired through imaging using a first setting area used in determination of the focusing position of the focus lens at the time of the second imaging, among second captured image data acquired through the second imaging. In the focusing position determination step, a setting area to be used in the determination of the focusing position is selected among the plurality of setting areas based on an evaluation result in the first evaluation step and an evaluation result in the second evaluation step.

According to the present invention, it is possible to provide a focusing control device, an imaging device, a focusing control method, and a focusing control program which are capable of performing subject tracking AF for continuing to focus on a desired subject with high accuracy.

DESCRIPTION OF THE PREFERRED EMBODIMENTS

Figure 1:
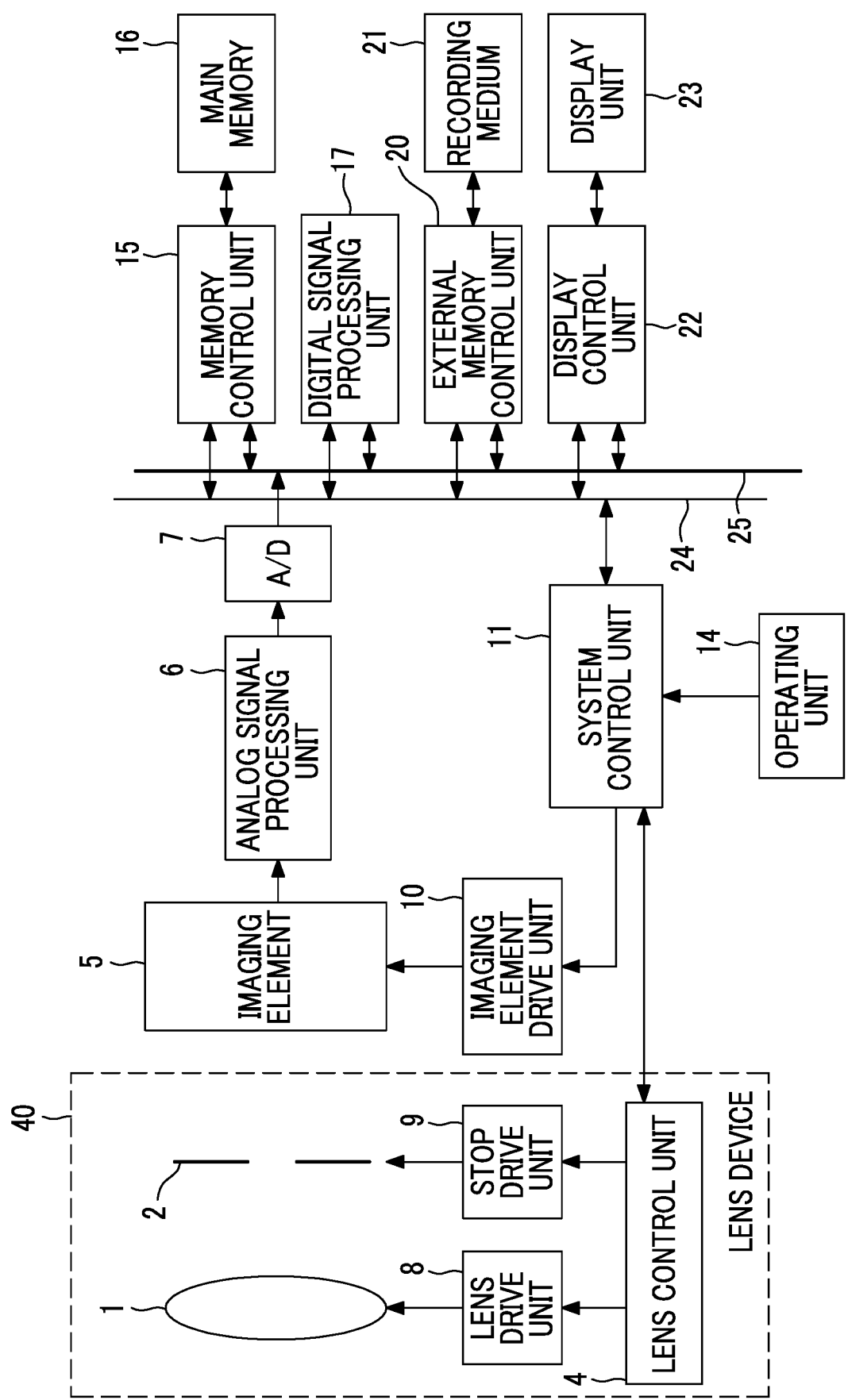
FIG. 1 is a diagram showing the schematic configuration of a digital camera as an example of an imaging device for describing an embodiment of the invention.

Hereinafter, an embodiment of the invention will be described by referring to the drawings.

FIG. 1 is a diagram showing the schematic configuration of a digital camera as an example of an imaging device for describing an embodiment of the invention.

The digital camera shown in FIG. 1 includes a lens device 40 that has an imaging lens 1, a stop 2, a lens control unit 4, a lens drive unit 8, and a stop drive unit 9. The lens device 40 may be detachably attached to the digital camera, or may be fixed to the digital camera.

The imaging lens 1 and the stop 2 constitute an imaging optical system, and the imaging optical system includes at least a focus lens. The focus lens is a lens for adjusting a focus of the imaging optical system, and is composed of a single lens or a plurality of lenses. The focus lens moves to an optical axis direction of the imaging optical system, and thus, the focus adjustment is performed.

The lens control unit 4 of the lens device 40 is able to communicate with a system control unit 11 of the digital camera in a wired or wireless manner. The lens control unit 4 drives the focus lens included in the imaging lens 1 through the lens drive unit 8 or drives the stop 2 through the stop drive unit 9 according to a command from the system control unit 11.

The digital camera includes an imaging element 5 which images a subject through the imaging optical system, such as a CCD type or CMOS type, an analog signal processing unit 6 which is connected to an output of the imaging element 5 and performs analog signal processing such as correlative double sampling processing, and an analog-to-digital conversion circuit 7 which converts the analog signal output from the analog signal processing unit 6 into a digital signal. The analog signal processing unit 6 and the analog-to-digital conversion circuit 7 are controlled by the system control unit 11.

The system control unit 11 that generally controls the entire electric control system of the digital camera drives the imaging element 5 through an imaging element drive unit 10, and outputs a subject image captured through the imaging optical system of the lens device 40, as captured image signals. A command signal from a user is input to the system control unit 11 through an operating unit 14.

The system control unit 11 includes a processor, a random access memory (RAM), and a read only memory (ROM).

The electric control system of the digital camera includes the main memory 16, a memory control unit 15 which is connected to the main memory 16, a digital signal processing unit 17 which generates captured image data by performing interpolation calculation, gamma correction calculation, color conversion processing, and the like on the captured image signals output from the analog-to-digital conversion circuit 7, an external memory control unit 20 to which a detachable recording medium 21 is connected, and a display control unit 22 to which a display unit 23 mounted on a camera rear surface or the like is connected.

The memory control unit 15, the digital signal processing unit 17, the external memory control unit 20, and the display control unit 22 are connected to one another by a control bus 24 and a data bus 25, and are controlled according to commands from the system control unit 11.

Figure 2:
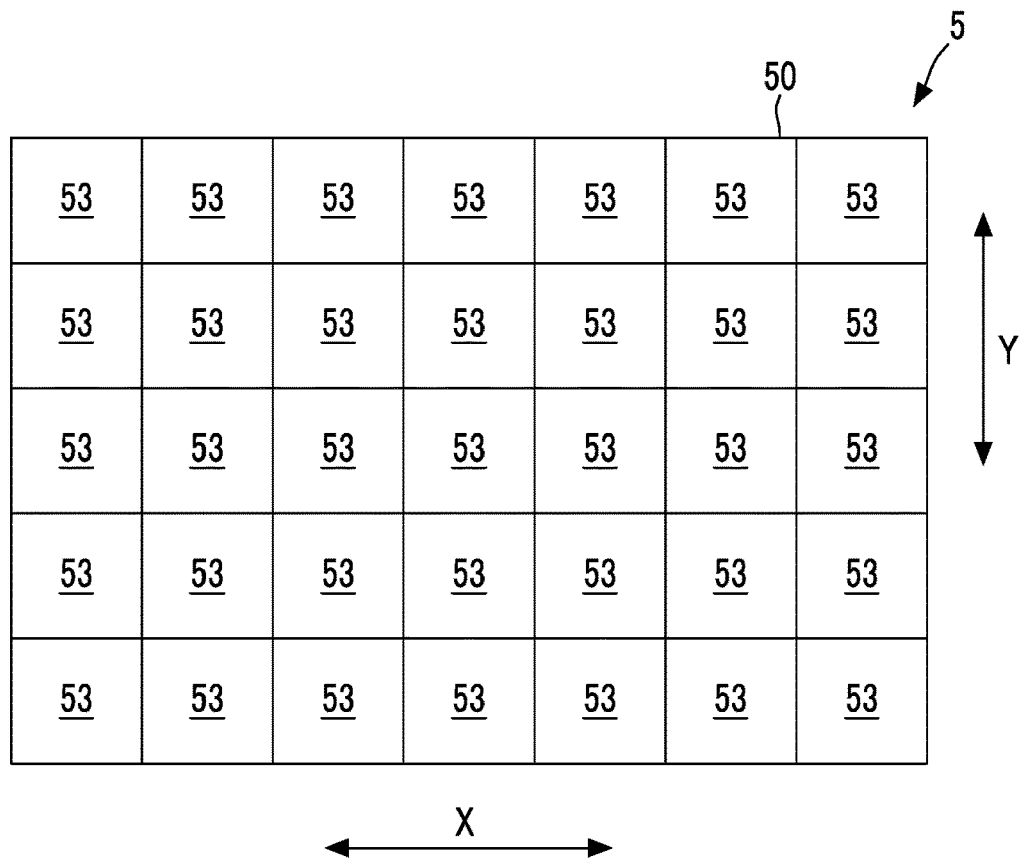
FIG. 2 is a schematic plan view showing the entire configuration of an imaging element 5 mounted on the digital camera shown in FIG. 1.

FIG. 2 is a schematic plan view showing the entire configuration of the imaging element 5 mounted on the digital camera shown in FIG. 1.

The imaging element 5 includes an imaging surface 50 on which a plurality of pixels arranged in a two-dimensional shape in a row direction X which is one direction and a column direction Y perpendicular to the row direction X is arranged. A plurality (35 in the example of FIG. 2) of focus detection areas (hereinafter, referred to as AF areas) 53 which is areas as targets to be in focus is set on the imaging surface 50. The AF areas 53 constitute a setting area.

The AF area 53 is an area including imaging pixels and phase difference detection pixels, as pixels. The AF areas 53 may be set on the imaging surface 50 with no space therebetween, or slight spaces may be formed between the AF areas 53. Identification numbers (N=1 to 35) are assigned to 35 AF areas 53.

Figure 3:
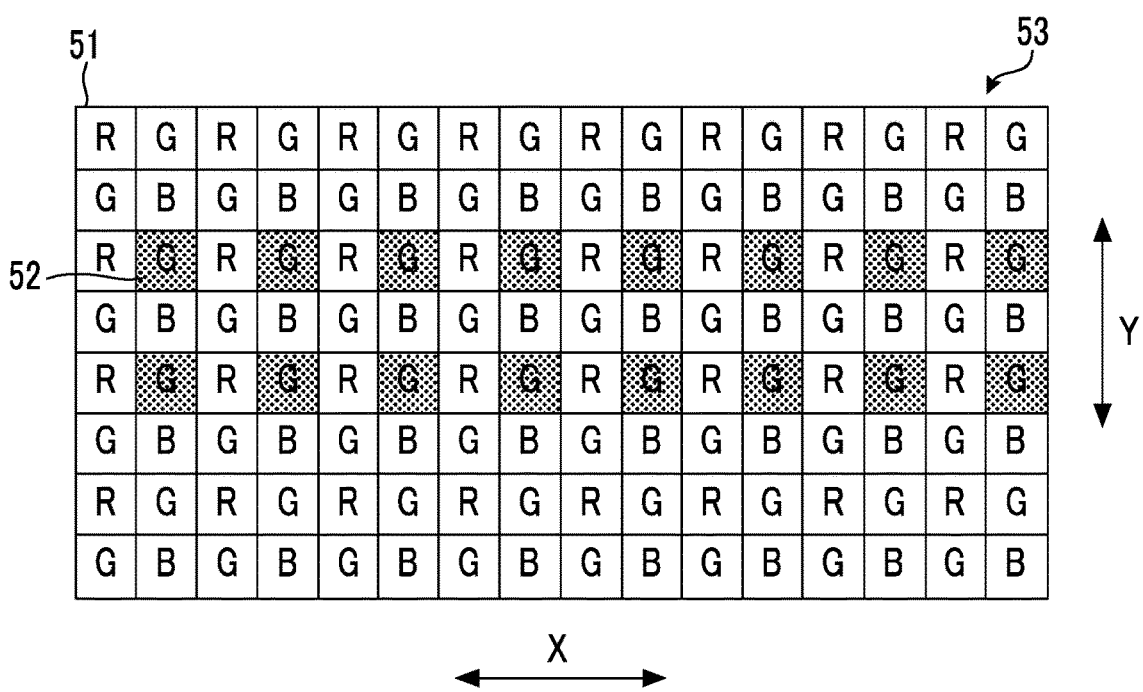
FIG. 3 is a partial enlarged view of one AF area 53 shown in FIG. 2.

FIG. 3 is a partial enlarged view of one AF area 53 shown in FIG. 2.

Pixels 51 are arranged in a two-dimensional shape in the AF area 53. The pixel 51 includes a photoelectric conversion section such as a photodiode and a color filter formed above the photoelectric conversion section.

In FIG. 3, the pixels 51 (referred to as R pixels 51) including the color filters (R filters) that transmit red light are assigned a character of "R", the pixels 51 (referred to as G pixels 51) including the color filters (G filters) that transmit green light are assigned a character of "G", and the pixels 51 (referred to as B pixels 51) including the color filters (B filters) that transmit blue light are assigned a character of "B". The arrangement of the color filters is a Bayer array on the entire imaging surface 50.

In the AF area 53, some (hatched pixels 51 in FIG. 3) of the G pixels 51 are phase difference detection pixels 52. In the example of FIG. 3, the G pixels 51 in an arbitrary pixel row among the pixel rows including the R pixels 51 and the G pixels 51 and G pixels 51 which are closest to the G pixels 51 in the column direction Y and have the same color as that of the G pixels are the phase difference detection pixels 52.

Figure 4:
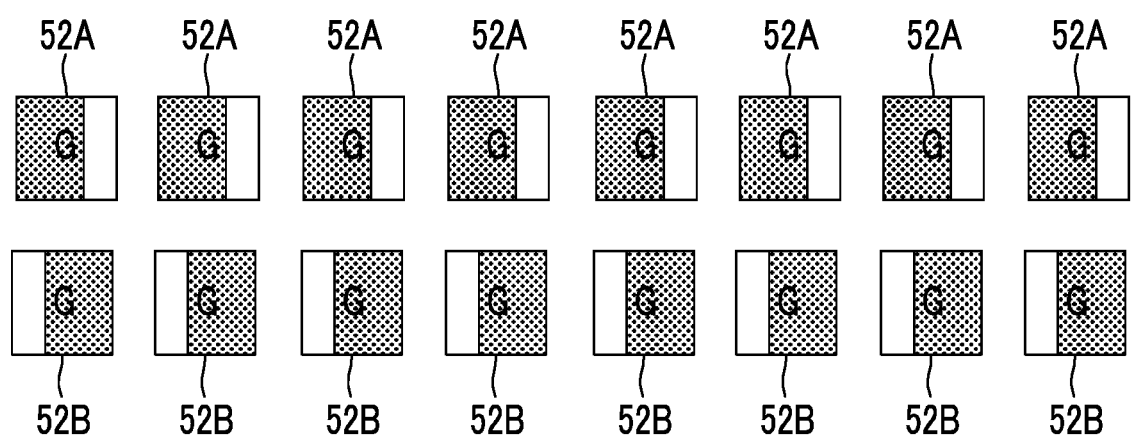
FIG. 4 is a diagram showing only phase difference detection pixels 52 shown in FIG. 3.

FIG. 4 is a diagram showing only the phase difference detection pixels 52 shown in FIG. 3.

As shown in FIG. 4, the phase difference detection pixels 52 includes two kinds of pixels such as phase difference detection pixels 52A and phase difference detection pixels 52B.

The phase difference detection pixel 52A is a first signal detection section which receives one of a pair of luminous fluxes passing through different two portions arranged in the row direction X of a pupil region of the imaging optical system, and detects a signal corresponding to a light reception amount.

The phase difference detection pixel 52B is a second signal detection section which receives the other one of the pair of luminous fluxes, and detects a signal corresponding to a light reception amount.

In the AF area 53, the plurality of pixels 51 other than the phase difference detection pixels 52A and 52B is the imaging pixels, and the imaging pixels receive a pair of luminous fluxes passing through the imaging lens 1, and detect signals corresponding to light reception amounts.

A light shielding film is formed on the photoelectric conversion sections of the pixels 51, and openings that prescribe light reception areas of the photoelectric conversion sections are formed in the light shielding film.

A center of the opening of the imaging pixel 51 matches a center of the photoelectric conversion section of the imaging pixel 51. In contrast, the center of the opening (a white portion of FIG. 4) of the phase difference detection pixel 52A is shifted to the right side from the center of the photoelectric conversion section of the phase difference detection pixel 52A.

The center of the opening (a white portion in FIG. 4) of the phase difference detection pixel 52B is shifted to the left side from the center of the photoelectric conversion section of the phase difference detection pixel 52B. The right side mentioned herein is one side in the row direction X shown in FIG. 3, and the left side is the other side in the row direction X.

Figure 5:
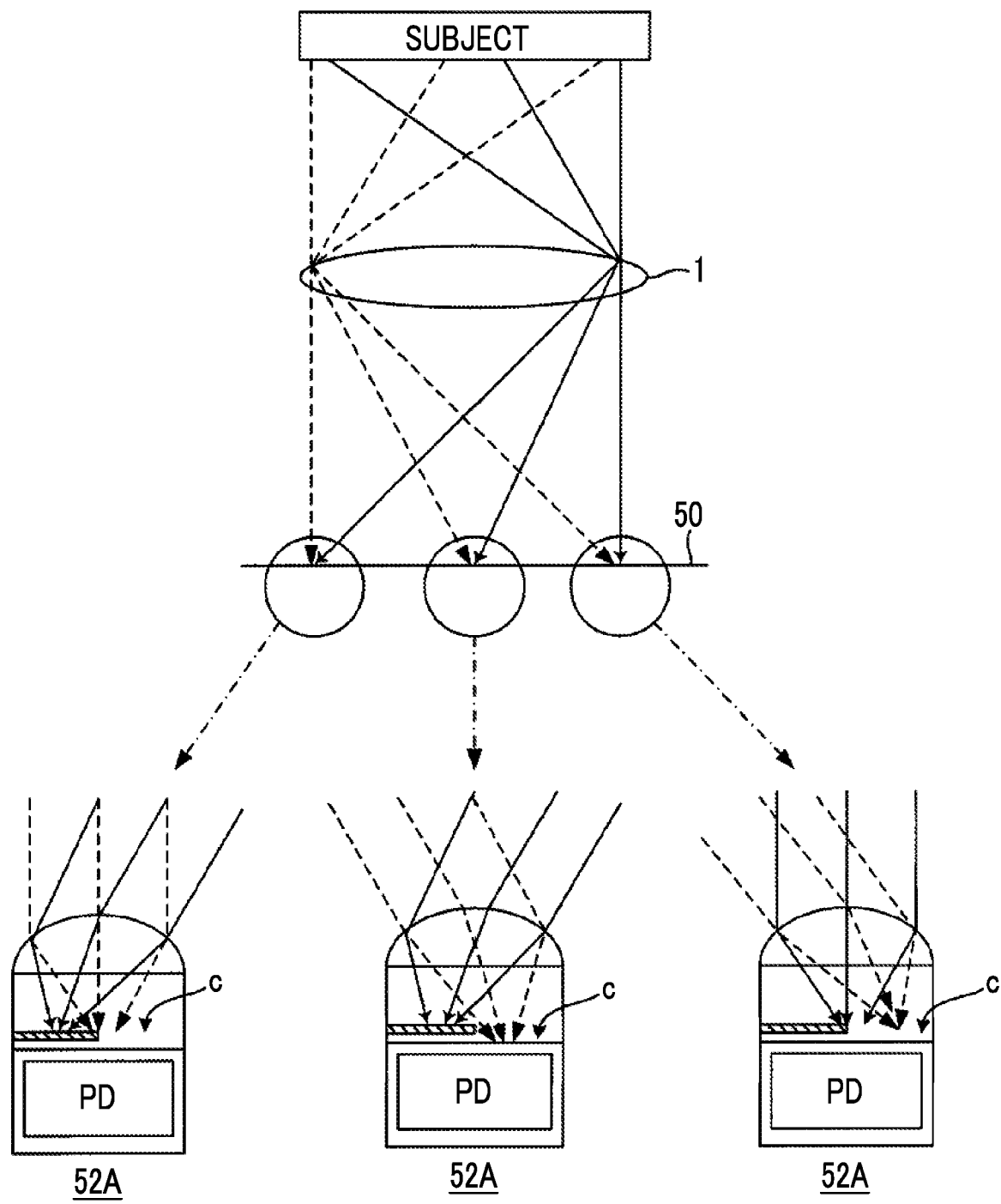
FIG. 5 is a diagram showing a cross-sectional configuration of a phase difference detection pixel 52A.

FIG. 5 is a diagram showing a cross-sectional configuration of the phase difference detection pixel 52A. As shown in FIG. 5, an opening c of the phase difference detection pixel 52A is shifted to the right side from the photoelectric conversion section (PD). As shown in FIG. 5, the one side of the photoelectric conversion section is covered with the light shielding film, and thus, light rays incident from a side opposite to the side covered with the light shielding film are selectively shielded.

With this configuration, it is possible to measure a phase difference amount between images captured by these two pixel groups, which include one pixel group including the phase difference detection pixels 52A present in an arbitrary row and the other pixel group including the phase difference detection pixels 52B arranged on one side of the phase difference detection pixels 52A of the one pixel group at the same distance, in the row direction X.

The imaging element 5 may include a plurality of pairs each including the first signal detection section that receives one of the pair of luminous fluxes passing through the different portions in the row direction X of the pupil region of the imaging optical system and detects the signal corresponding to the light reception amount and the second signal detection section that receives the other one of the pair of luminous fluxes and detects the signal corresponding to the light reception amount, and is not limited to the configuration shown in FIGS. 2 to 5.

For example, all the pixels included in the imaging element 5 are the imaging pixels 51. The imaging pixel 51 is divided into two. One divided portion may be the phase difference detection pixel 52A, and the other divided portion may be the phase difference detection pixel 52B.

Figure 6:
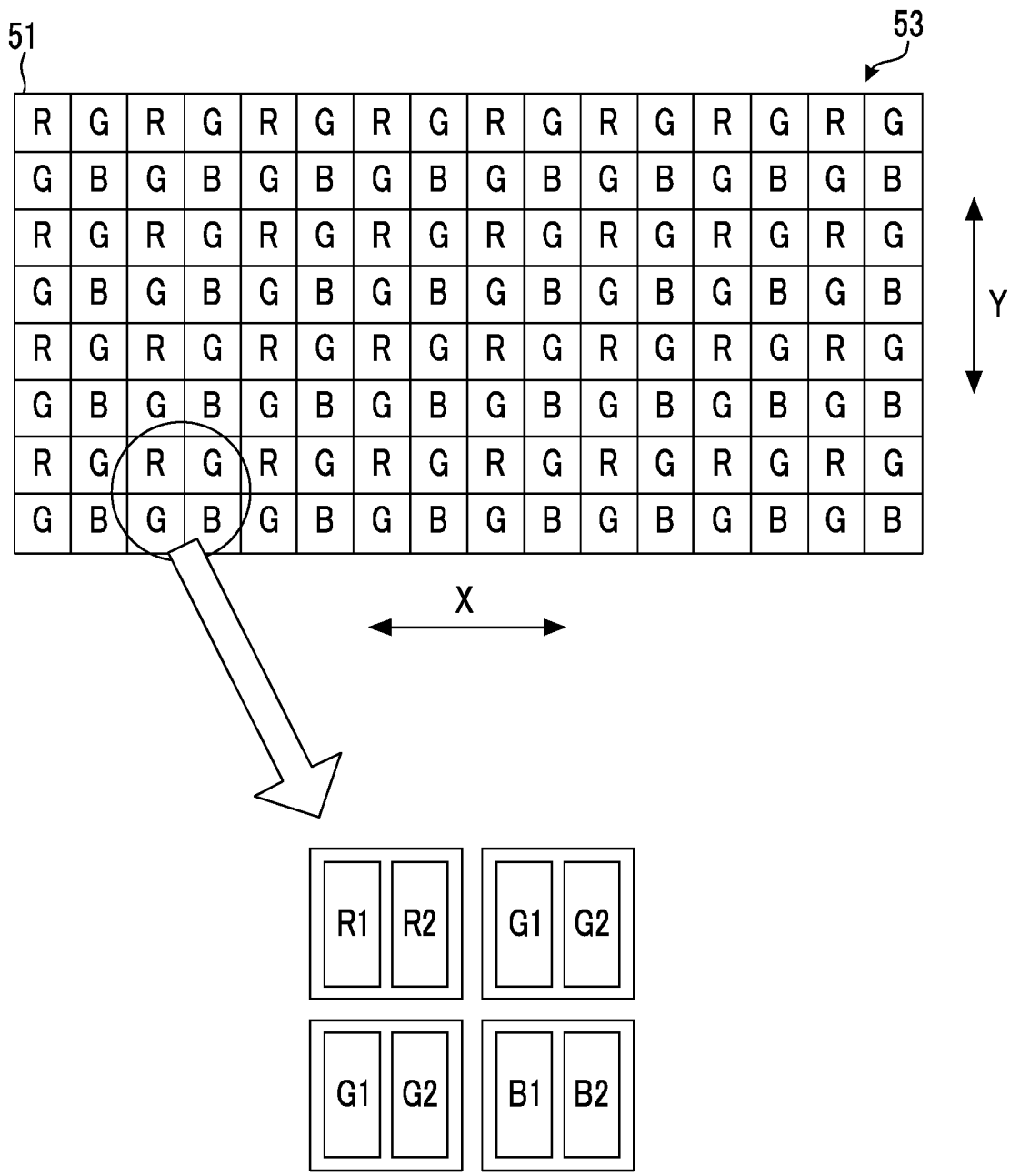
FIG. 6 is a diagram showing a configuration in which all pixels included in an imaging element 5 are imaging pixels 51 and each imaging pixel 51 is divided into two.

FIG. 6 is a diagram showing a configuration in which all the pixels included in the imaging element 5 are the imaging pixels 51 and the imaging pixels 51 are divided into two divided portions.

In the configuration of FIG. 6, the imaging pixel 51 assigned R in the imaging element 5 is divided into two, and two divided portions are a phase difference detection pixel R1 and a phase difference detection pixel R2.

The imaging pixel 51 assigned G in the imaging element 5 is divided into two, and two divided portions are a phase difference detection pixel G1 and a phase difference detection pixels G2.

The imaging pixel 51 assigned B in the imaging element 5 is divided into two, and two divided portions are a phase difference detection pixel B1 and a phase difference detection pixels B2.

In this configuration, the phase difference detection pixels R1, G1, and B1 are the first signal detection sections, and the phase difference detection pixels R2, G2, and B2 are the second signal detection sections. The signals may be independently read out from the first signal detection sections and the second signal detection sections.

In a case where the signals of the first signal detection sections and the second signal detection sections are added, typical imaging signals having no phase difference are acquired. That is, in the configuration of FIG. 6, all the pixels may be used as both of the phase difference detection pixels and the imaging pixels.

Figure 7:
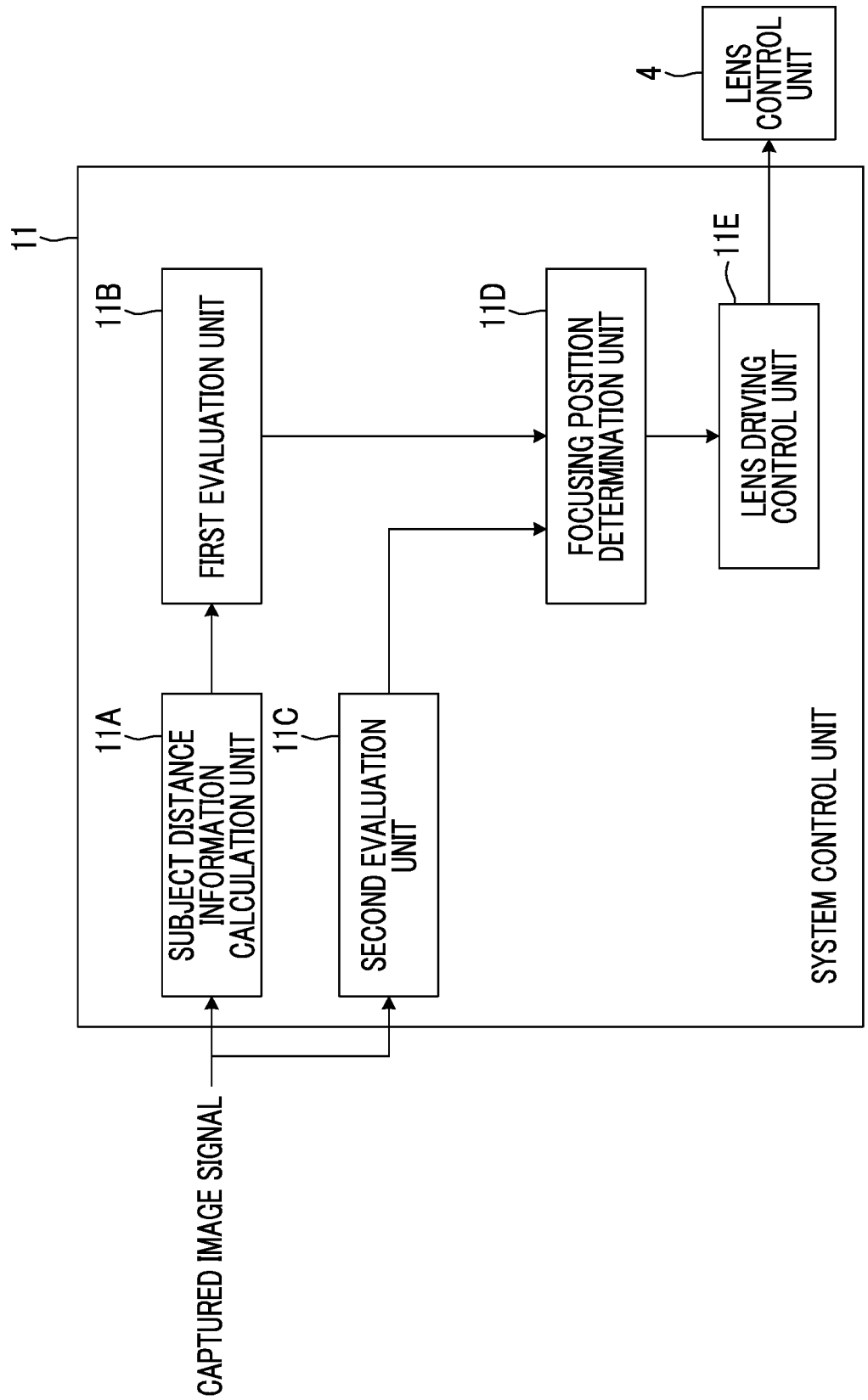
FIG. 7 is a diagram showing a function block of a system control unit 11 shown in FIG. 1.

FIG. 7 is a diagram showing a functional block of the system control unit 11 shown in FIG. 1.

The system control unit 11 includes a subject distance information calculation unit 11A, a first evaluation unit 11B, a second evaluation unit 11C, a focusing position determination unit 11D, and a lens driving control unit 11E. The processor executes a focusing control program stored in the ROM, and thus, these functional blocks are formed. The system control unit 11 constitutes a focusing control device.

The subject distance information calculation unit 11A calculates first subject distance information of the subject formed in the AF areas 53 for each of 35 AF areas 53 set on the imaging surface 50 based on first captured image signals acquired by the imaging element 5 that images the subject. The subject distance information refers to a distance between the imaging surface 50 and the subject being in focus.

The subject distance information calculation unit 11A calculates a phase difference amount in the row direction X by performing a correlation operation on output signals of the phase difference detection pixels 52A and 52B included in the signals, among the first captured image signals, which are acquired from an arbitrary AF area 53, and calculates the first subject distance information corresponding to the arbitrary AF area 53 by the known method based on the calculated phase difference amount.

The first evaluation unit 11B evaluates each AF area 53 based on second subject distance information in a focusing state at the time of second imaging performed earlier than the time when first imaging for acquiring the first captured image signals is performed and the first subject distance information for each AF area 53 calculated by the subject distance information calculation unit 11A.

The first evaluation unit 11B determines a first degree of similarity between the first subject distance information and the second subject distance information for each AF area 53, and gives a higher evaluation as the first degree of similarity becomes higher. The first degree of similarity is a value indicating how similar the two subject distance information items are, and is, for example, a value between 0% and 100%. The smaller the value is, the lower the first degree of similarity is.

For example, the first evaluation unit 11B calculates a value in inverse proportion to a difference (absolute value without regard to its sign) between the first subject distance information and the second subject distance information or a ratio (a value acquired by dividing the first subject distance information by the second subject distance information) of the first subject distance information to the second subject distance information, as the first degree of similarity.

The first evaluation unit 11B evaluates the AF area 53 of which the first degree of similarity is equal to or greater than a first threshold value, as an area of which a first evaluation value is equal to or greater than an evaluation threshold value. The first evaluation unit 11B stores the first degree of similarity acquired for the AF area 53 in association with information indicating that the first evaluation value is equal to or greater than the evaluation threshold value and the identification number of the AF area 53 in the RAM of the system control unit 11.

The first evaluation unit 11B evaluates the AF area 53 in which the first degree of similarity is less than the first threshold value, as an area in which the first evaluation value is less than the evaluation threshold value. The first evaluation unit 11B stores the identification number of the AF area 53 in association with information indicating that the first evaluation value is less than the evaluation threshold value in the RAM of the system control unit 11.

The second evaluation unit 11C evaluates each AF area 53 based on the first captured image signal and a partial image signal acquired through imaging using the AF area 53 (constituting a first setting area) used in the determination of the focusing position of the focus lens at the time of the second imaging, among the second captured image signals acquired through the second imaging.

Specifically, the second evaluation unit 11C determines a second degree of similarity between the partial image signal and an image signal constituting a portion corresponding to each AF area 53 among the first captured image signals, and gives a higher evaluation as the second degree of similarity becomes higher. The second degree of similarity is a value indicating how similar the two image signals are, and is expressed, for example, by a value between 0% and 100%. The smaller the value is, the lower the second degree of similarity is.

The second evaluation unit 11C determines the second degree of similarity by performing matching color information items of two image signals as determination targets of the second degree of similarity, matching of brightness information items of the two image signal, or pattern matching of the two image signal.

For the AF area 53 corresponding to the image signal of which the second degree of similarity is equal to or greater than a second threshold value, the second evaluation unit 11C stores the second degree of similarity calculated for the AF area 53 in association with the identification number of the AF area 53 and information indicating that a second evaluation value is equal to or greater than an evaluation threshold value in the RAM.

For the AF area 53 corresponding to the image signal of which the second degree of similarity is less than the second threshold value, the second evaluation unit 11C stores the identification number of the AF area 53 in association with information indicating that the second evaluation value is less than the evaluation threshold value in the RAM.

The focusing position determination unit 11D selects the AF area 53 to be used in the determination of the focusing position among 35 AF areas 53 based on the evaluation result (various information items in association with the identification number of the AF area 53 stored in the RAM) using the first evaluation unit 11B and the evaluation result (various information items in association with the identification number of the AF area 53 stored in the RAM) using the second evaluation unit 11C, and determines the focusing position of the focus lens based on the captured image signals acquired through the imaging using the selected AF area 53.

The focusing position determination unit 11D calculates the phase difference amount by performing the correlation operation on the output signals of the phase difference detection pixels 52A and 52B included in the captured image signals acquired through the imaging using the selected AF area 53, and determines the focusing position of the focus lens based on the phase difference amount.

The lens driving control unit 11E outputs a command to the lens control unit 4, and performs control for moving the focus lens to the focusing position determined by the focusing position determination unit 11D.

Hereinafter, an operation of the digital camera having the above-described configuration at the time of subject tracking AF will be described.

Figure 8:
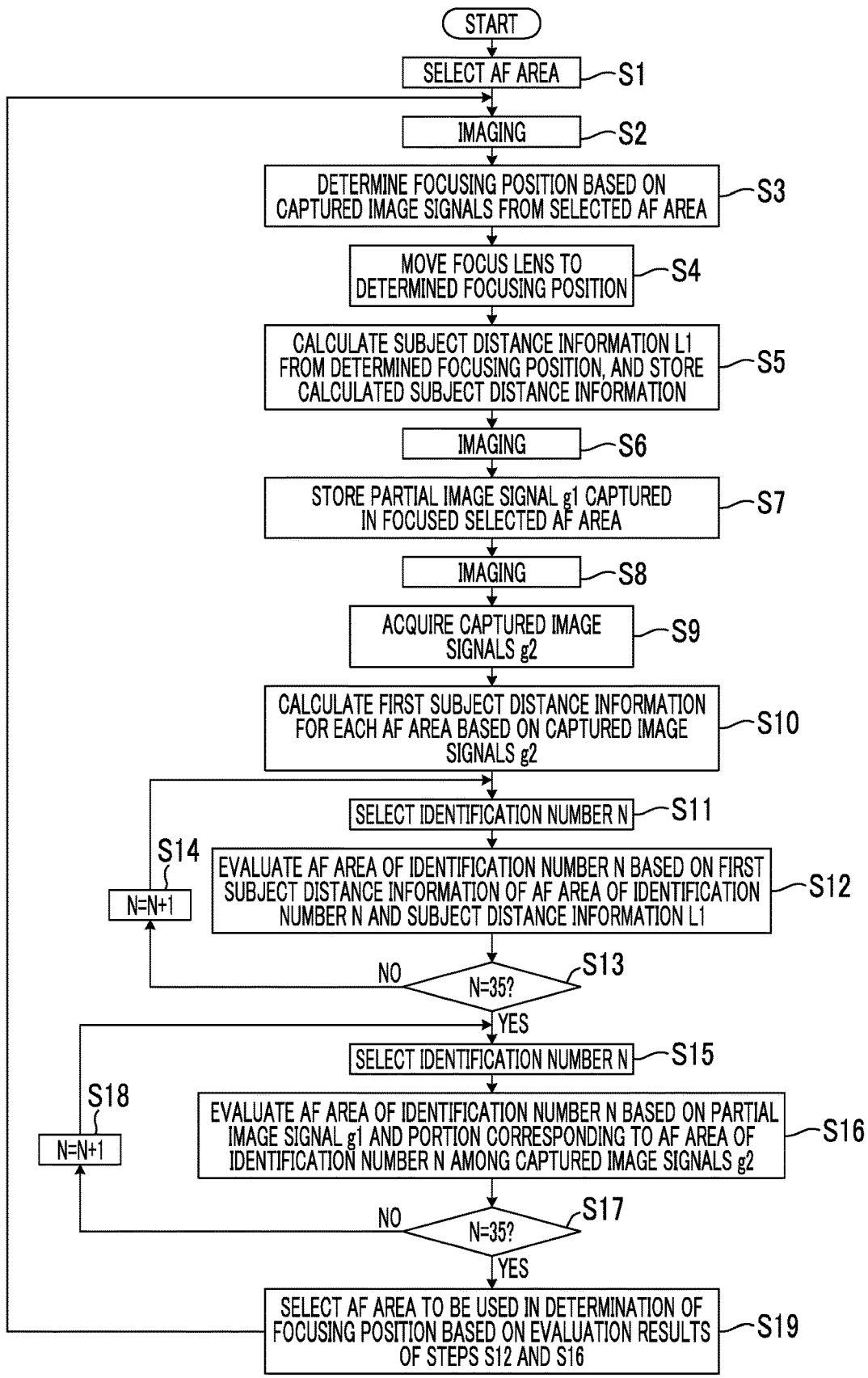
FIG. 8 is a flowchart for describing an operation of the digital camera shown in FIG. 1 at the time of subject tracking AF.
Figure 9:
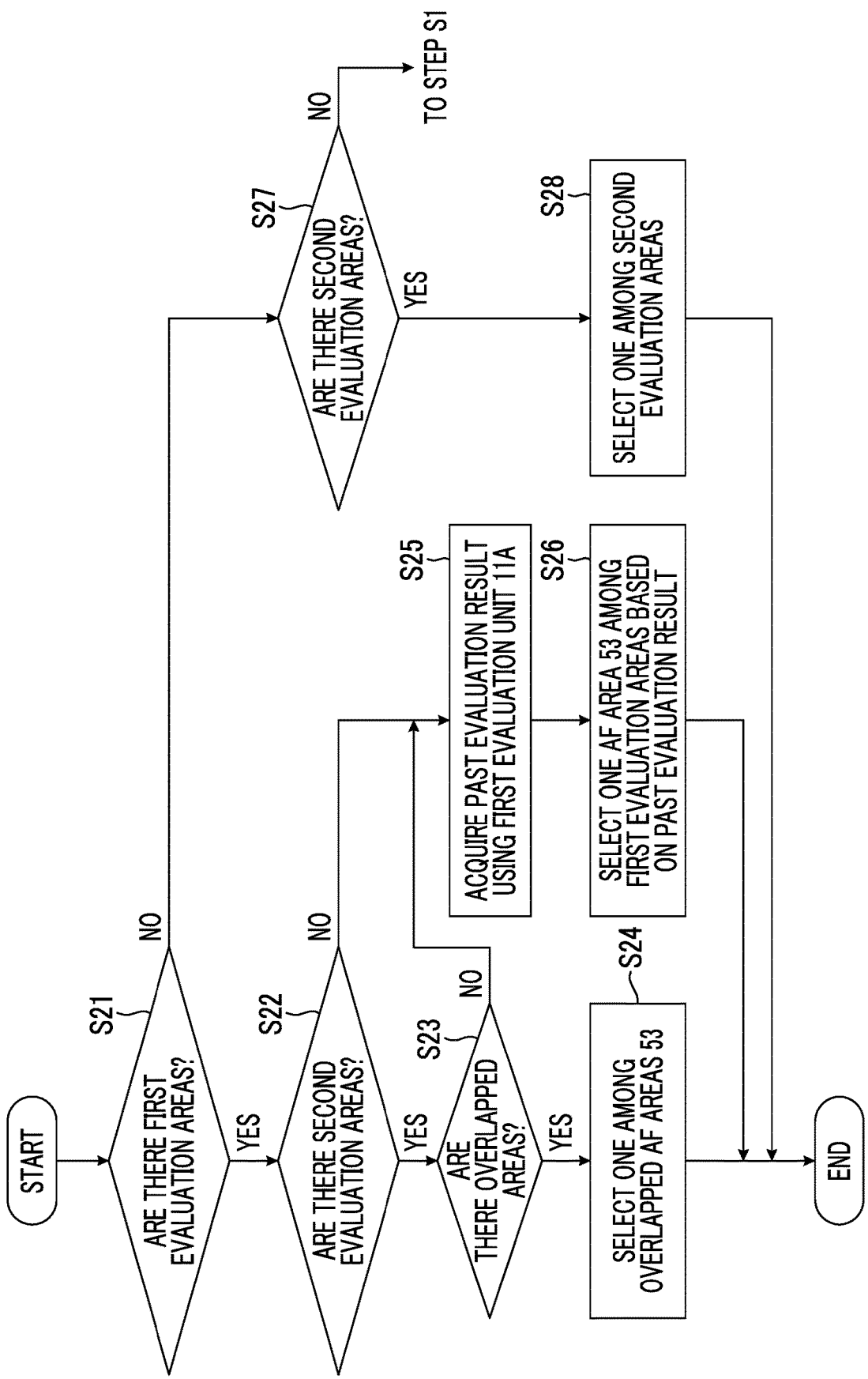
FIG. 9 is a flowchart showing the details of step S19 shown in FIG. 8.

FIG. 8 is a flowchart for describing the operation of the digital camera shown in FIG. 1 at the time of the subject tracking AF. FIG. 9 is a flowchart showing the details of step S19 shown in FIG. 8.

Figure 10:
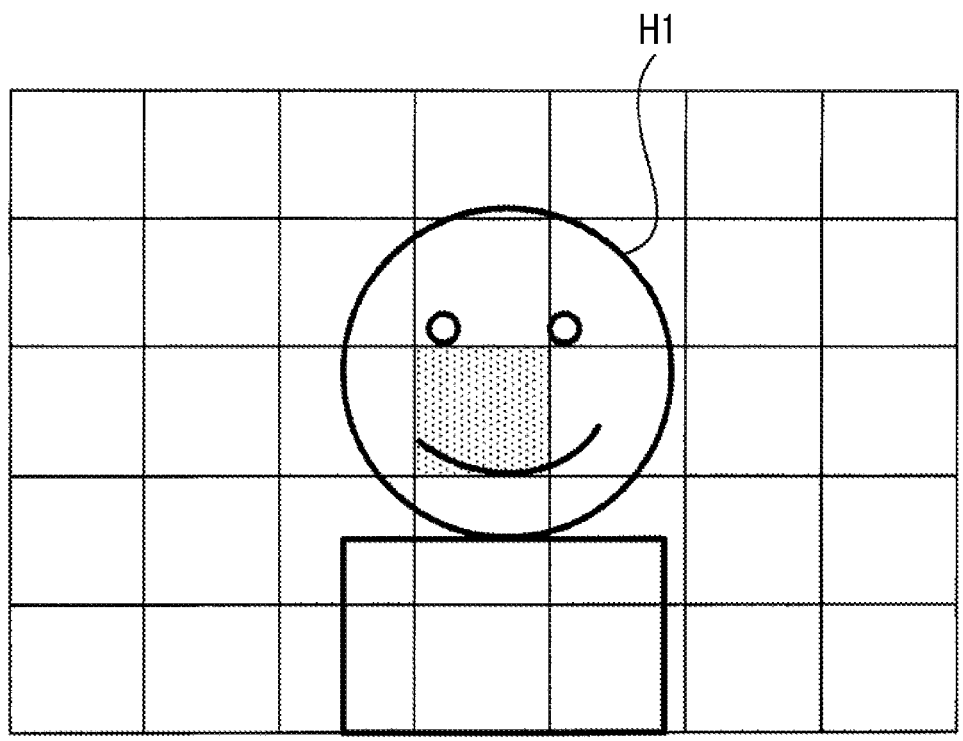
FIG. 10 is a diagram showing an example of a subject image formed on an imaging surface 50 of the imaging element 5.
Figure 11:
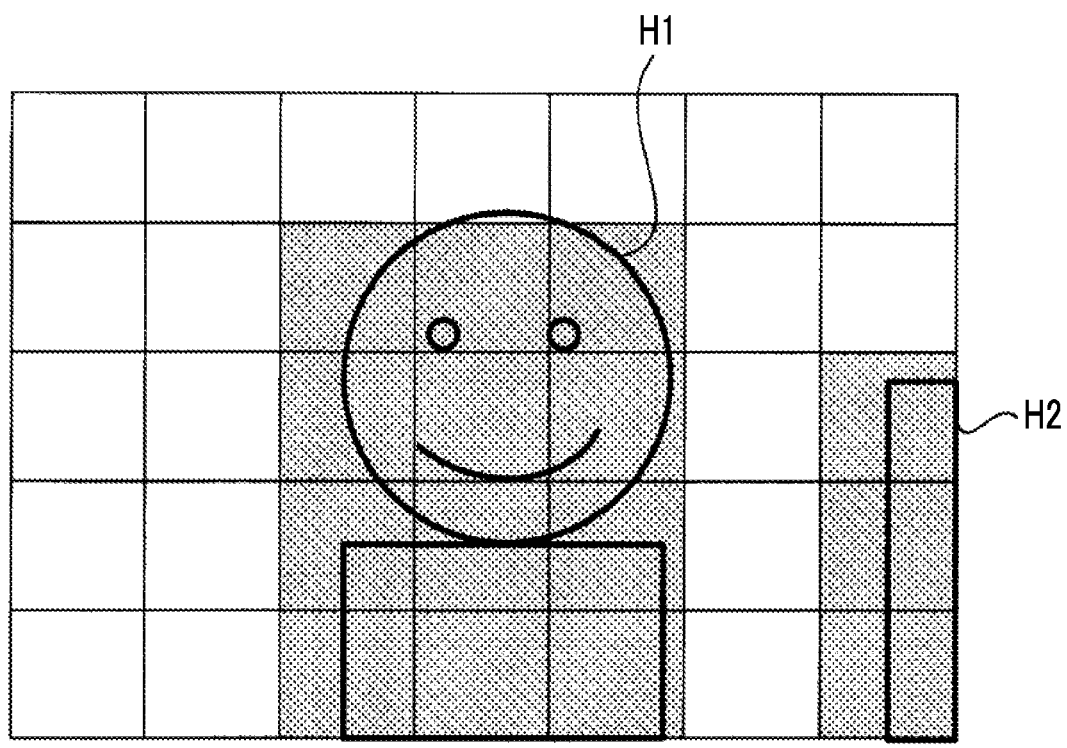
FIG. 11 is a diagram showing an example of the subject image formed on the imaging surface 50 of the imaging element 5.
Figure 12:
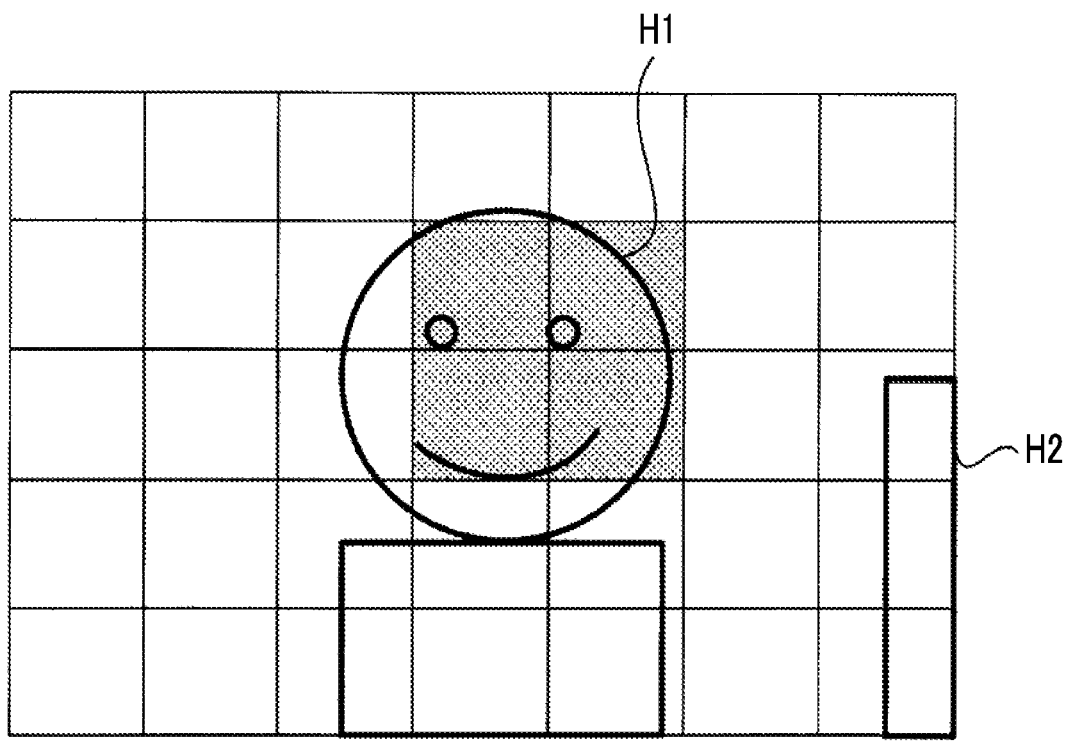
FIG. 12 is a diagram showing an example of the subject image formed on the imaging surface 50 of the imaging element 5.

FIGS. 10 to 12 are diagrams showing examples of a subject image formed on the imaging surface 50 of the imaging element 5. Each block shown in FIGS. 10 to 12 represents the AF area 53 of FIG. 2.

In a case where the digital camera is set in an imaging mode and an instruction of the subject tracking AF is received, a motion picture imaging is started by the imaging element 5. Initially, the focusing position determination unit 11D selects the AF area 53, among the 35 AF areas 53, which is specified in advance by a user of the digital camera or the AF area 53 (for example, the middle area) determined in advance by the system (step S1).

In step S1, it is assumed that the hatched AF area 53 in which a part of a face of a person H1 is formed is selected, as shown in FIG. 10.

Subsequently, in a case where imaging is performed by the imaging element 5 (step S2), the focusing position determination unit 11D acquires the captured image signals output from the selected AF area 53 through the imaging, calculates the phase difference amount based on the captured image signals, and determines the focusing position of the focus lens based on the calculated phase difference amount (step S3).

The subject image captured in step S2 includes the person H1, as shown in FIG. 10.

Subsequently, the lens driving control unit 11E moves the focus lens to the focusing position determined in step S3 (step S4).

Subsequently, the subject distance information calculation unit 11A calculates subject distance information L1 in a focusing state in which the focus lens is present in the focusing position based on the focusing position determined in step S3, and stores the calculated subject distance information in the RAM (step S5).

The subject distance information L1 corresponds to a distance from the imaging surface 50 to the person H1 shown in FIG. 10. The subject distance information L1 constitutes the second subject distance information.

The subject distance information calculation unit 11A may calculate the subject distance information L1 based on the phase difference amount calculated by the focusing position determination unit 11D in step S3.

Subsequently, in a case where the imaging is performed by the imaging element 5 in a state in which the focus lens is present in the focusing position (step S6), the subject distance information calculation unit 11A acquires a partial image signal g1 acquired through the imaging using the AF area 53 selected by the focusing position determination unit 11D, among the captured image signals acquired through the imaging, and stores the partial image signal g1 in the RAM (step S7).

The subject image captured in step S6 includes the person H1, as shown in FIG. 10.

Subsequently, in a case where the imaging is performed by the imaging element 5 (step S8), the subject distance information calculation unit 11A acquires captured image signals g2 acquired through the imaging (step S9). As shown in FIG. 11, the subject image captured in step S8 includes an object H2 in addition to the person H1 shown in FIG. 10. The captured image signals g2 constitute the first captured image signal.

The subject distance information calculation unit 11A calculates the first subject distance information for each of the 35 AF areas 53 based on the captured image signals g2 acquired in step S9, and stores the calculated first subject distance information in the RAM (step S10).

Subsequently, the first evaluation unit 11B selects an identification number N (an initial value of N is "1") (step S11), and evaluates the AF area 53 assigned the identification number N based on the first subject distance information calculated for the AF area 53 assigned the identification number N in step S10 and the subject distance information L1 calculated in step S5 (step S12).

Thereafter, the first evaluation unit 11B determines whether or not the identification number N is "35" (step S13). In a case where the identification number N is less than "35" (step S13: NO), the first evaluation unit increases the identification number N by one (step S14), and the process returns to step S11.

In a case where the identification number N is "35" (step S13: YES), the second evaluation unit 11C selects the identification number N (the initial value of N is "1") (step S15).

The second evaluation unit 11C evaluates the AF area 53 assigned the identification number N based on a portion corresponding to the AF area 53 assigned the identification number N, among the captured image signals g2, and the partial image signal g1 stored in step S7 (step S16).

Subsequently, the second evaluation unit 11C determines whether or not the identification number N is "35" (step S17). In a case where the identification number N is less than "35" (step S17: NO), the second evaluation unit 11C increases the identification number N by one (step S18), and the process returns to step S15.

In a case where the identification number N is "35" (step S17: YES), the focusing position determination unit 11D selects the AF area to be used in the determination of the focusing position among the 35 AF areas 53 based on the evaluation result using the first evaluation unit 11B in step S12 and the evaluation result using the second evaluation unit 11C in step S16 (step S19).

After the process of step S19, the various information items stored in the RAM are removed, and the process returns to step S2. The above-described operations are repeated, and thus, the subject tracking AF is performed. The details of step S19 will be described with reference to FIG. 9.

In a case where the determination result in step S17 of FIG. 8 is YES, the focusing position determination unit 11D determines whether or not there are the AF areas 53 (hereinafter, referred to as first evaluation areas) for which the first evaluation unit 11B determines that the first evaluation value is equal to or greater than the evaluation threshold value (step S21).

In a case where it is determined that there is the first evaluation area (step S21: YES), the focusing position determination unit 11D determines whether or not there are the AF areas 53 (hereinafter, referred to as second evaluation areas) for which the second evaluation unit 11C determines that the second evaluation value is equal to or greater than the evaluation threshold value (step S22).

In a case where it is determined that there is the second evaluation area (step S22: YES), the focusing position determination unit 11D determines whether or not there are the overlapped areas of the first evaluation areas and the second evaluation areas (step S23).

In step S23, the focusing position determination unit 11D detects the AF areas 53 having the identification number associated with the information indicating that the first evaluation value is equal to or greater than the evaluation threshold value and the information indicating that the second evaluation value is equal to or greater than the evaluation threshold value, as the overlapped areas of the first evaluation areas and the second evaluation areas, while referring to the information items in association with the identification numbers of the AF areas 53 stored in the RAM.

15 blocks hatched in FIG. 11 are the AF areas 53 (first evaluation areas) for which the first evaluation unit 11B determines that the first evaluation value is equal to or greater than the evaluation threshold value in the process of step S12.

Four blocks hatched in FIG. 12 are the AF areas 53 (second evaluation areas) for which the second evaluation unit 11C determines that the second evaluation value is equal to or greater than the evaluation threshold value in the process of step S16.

In the examples shown in FIGS. 11 and 12, the four hatched AF areas 53 shown in FIG. 12 are detected as the overlapped areas of the first evaluation areas and the second evaluation areas.

In a case where the determination result in step S23 is YES, the focusing position determination unit 11D selects any one of the overlapped areas (the four hatched AF areas 53 shown in FIG. 12), as an area to be used in the determination of the focusing position (step S24).

For example, the focusing position determination unit 11D selects the AF area 53 in which the first degree of similarity is the maximum, the AF area 53 of which the second degree of similarity is the maximum, or the AF area 53 in which the sum of the first degree of similarity and the second degree of similarity is the maximum, among the four AF areas 53.

In a case where there is a plurality of AF areas 53 in which the first degree of similarity is the maximum, the AF areas 53 in which the second degree of similarity is the maximum, or the AF areas 53 in which the sum of the first degree of similarity and the second degree of similarity is the maximum, the focusing position determination unit 11D selects any one of the plurality of AF areas 53.

In a case where there is one overlapped area of the first evaluation areas and the second evaluation areas, the focusing position determination unit 11D selects one AF area 53 in step S24.

In a case where it is determined that there is no first evaluation area in step S21 (step S21: NO), the focusing position determination unit 11D subsequently determines whether or not there are the second evaluation areas (step S27).

In a case where it is determined that there are the second evaluation areas (step S27: YES), the focusing position determination unit 11D selects one AF area 53 among the second evaluation areas (step S28). For example, the focusing position determination unit 11D selects the AF area 53 in which the second degree of similarity is the maximum among the second evaluation areas.

In a case where it is determined that there is no second evaluation area (step S27: NO), the process returns to step S1, and the focusing position determination unit 11D selects a predetermined AF area 53.

In a case where it is determined that there is no second evaluation area in step S22 (step S22: NO) and a case where it is determined that there is no overlapped area in step S23 (step S23: NO), the focusing position determination unit 11D acquires the past evaluation result acquired through the evaluation of the first evaluation unit 11B (step S25).

The focusing position determination unit 11D selects one AF area 53 among the first evaluation areas based on the acquired past evaluation result and the latest evaluation result using the first evaluation unit 11B acquired in the most recently performed processes of step S10 to step S13 (step S26).

Figure 13:
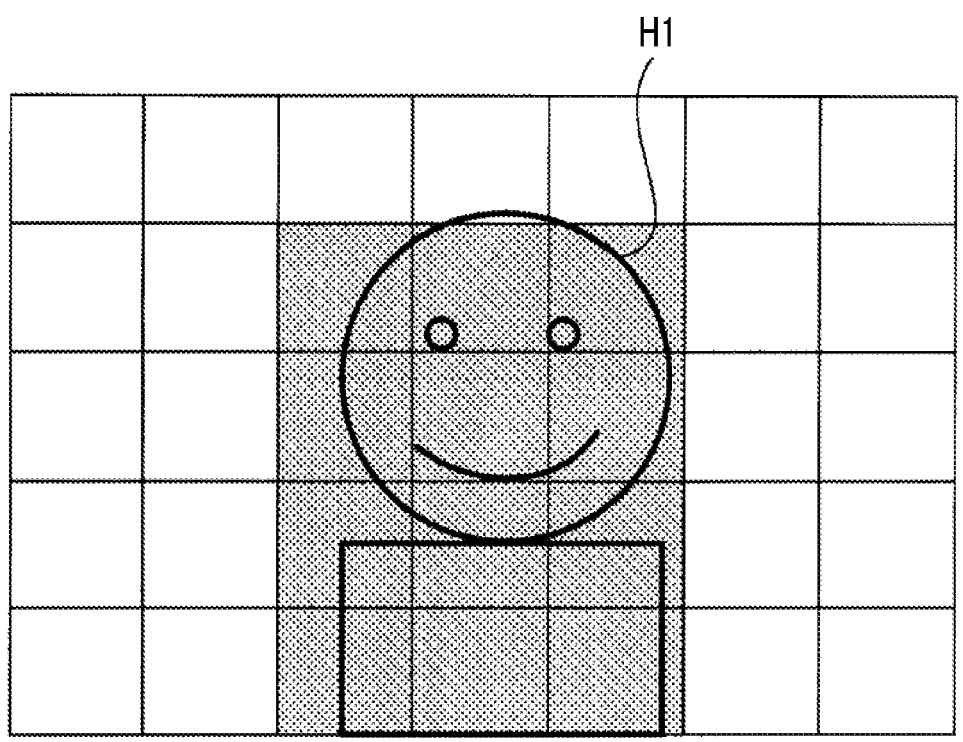
FIG. 13 is a diagram showing an example of the subject image formed on the imaging surface 50 of the imaging element 5.

For example, a case where the past evaluation result is shown in FIG. 13 is considered. The AF areas 53 hatched in FIG. 13 are the areas for which it is determined that the first evaluation value is equal to or greater than the evaluation threshold value. The latest evaluation result is shown in FIG. 11.

Here, it is assumed that the state shown in FIG. 13 is continued as the evaluation result using the first evaluation unit 11B after the subject tracking AF is started and the evaluation result is changed from this state to the state shown in FIG. 11.

In this case, the focusing position determination unit 11D sets a shape of a group of first evaluation areas determined by the positions and number of hatched AF areas 53 shown in FIG. 13, as a reference shape, and searches for first evaluation areas constituting a group similar to the reference shape, among the first evaluation areas shown in FIG. 11.

For example, the focusing position determination unit 11D selects the AF area 53 in which the first degree of similarity is the maximum, among the first evaluation areas constituting the group similar to the reference shape. Accordingly, in the example of FIG. 11, any of the hatched AF areas 53 in which the person H1 is formed is selected in step S19.

As stated above, it is possible to determine the focusing position by using any of the AF areas 53 in which the person H1 is formed by referring a distribution shape of the past first evaluation areas even in a case where the state of FIG. 13 is changed to the state of FIG. 11. Thus, it is possible to continuously track the person H1 without being focused on the object H2.

in FIG. 9, in a case where the determination result in step S22 is NO and a case where the determination result in step S23 is NO, the focusing position determination unit 11D may select the AF area 53 closest to the most recently selected AF area 53 among the first evaluation areas.

By doing this, it is possible to determine the focusing position by using the AF areas 53 on which the person H1 is formed even in a case where the state of FIG. 13 is changed to the state of FIG. 11. Thus, it is possible to continuously track the person H1 without being focused on the object H2.

As stated above, according to the digital camera of FIG. 1, the AF area 53 to be used in the determination of the focusing position is selected based on the evaluation result using the first evaluation unit 11B and the evaluation result using the second evaluation unit 11C.

Thus, it is possible to select the AF areas 53 in which the person H1 is formed by selecting the overlapped area of the first evaluation areas and the second evaluation areas even in a case where an orientation of the person H1 is changed and the positions and number of second evaluation areas are changed. Accordingly, it is possible to perform the subject tracking AF with high accuracy.

Even in a case where the object H2 suddenly enters within an angle of view in a state in which the person H1 is captured, the focusing position is determined by selecting the overlapped area of the first evaluation areas and the second evaluation areas, and thus, it is possible to select the AF areas 53 in which the person H1 is formed. Accordingly, it is possible to perform the subject tracking AF with high accuracy.

In the digital camera of FIG. 1, the subject distance information calculation unit 11A calculates the first subject distance information based on the result of the correlation operation using the signals of the phase difference detection pixels 52A and 52B. Thus, it is possible to calculate the first subject distance information for each AF area 53 at a high speed, and it is possible to improve a processing speed of the subject tracking AF.

In the flowchart shown in FIG. 8, the orders of the processes of step S10 to step S13 and the processes of step S15 to step S17 may be reversed.

It has been described above that the imaging element 5 has the phase difference detection pixels 52A and 52B and the system control unit 11 determines the focusing position based on the detection signals of the phase difference detection pixels 52A and 52B within the AF area 53 selected by the focusing position determination unit 11D, that is, performs focusing control in a phase difference AF method.

As a modification example, the system control unit 11 may perform the focusing control in a contrast AF method. In this case, for example, an imaging element includes only the imaging pixels is used as the imaging element 5.

Figure 14:
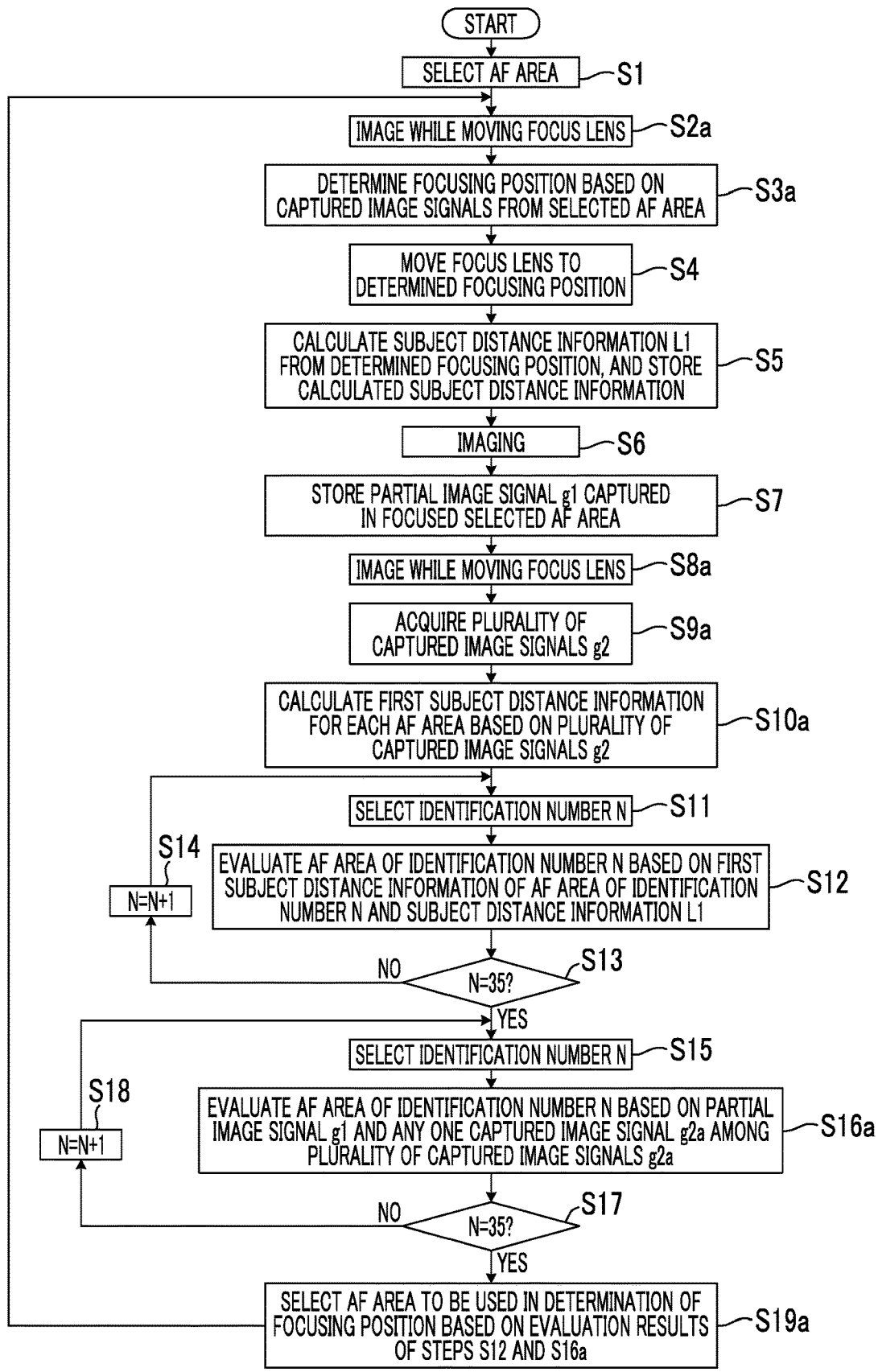
FIG. 14 is a flowchart for describing an operation of a modification example of the digital camera shown in FIG. 1 at the time of the subject tracking AF.

FIG. 14 is a flowchart for describing an operation of a modification example of the digital camera shown in FIG. 1 at the time of the subject tracking AF. In FIG. 14, the same processes as the processes shown in FIG. 8 will be assigned the same references, and the description thereof will be omitted.

After the AF area 53 is selected in step S1, the focusing position determination unit 11D causes the imaging element 5 to perform the imaging while moving the focus lens by controlling the lens control unit 4 and the imaging element drive unit 10 to cause the imaging element 5 (step S2a).

Subsequently, the focusing position determination unit 11D calculates AF evaluation values indicating sharpness of an image from the plurality of captured image signals acquired in the positions of the focus lens through the imaging in step S2a, and determines the position of the focus lens in a case where the captured image signal as a calculation source of the maximum AF evaluation value among the calculated AF evaluation values is acquired, as the focusing position (step S3a).

Thereafter, the lens driving control unit 11E moves the focus lens to the focusing position determined in step S3a (step S4). The processes of step S5 to step S7 are performed after step S4.

After step S7, the subject distance information calculation unit 11A causes the imaging element 5 to perform the imaging white moving the focus lens by controlling the lens control unit 4 and the imaging element drive unit 10 (step S8a).

Subsequently, the subject distance information calculation unit 11A acquires a plurality of captured image signals g2a in the positions of the focus lens acquired through the imaging in step S8a (step S9a). The plurality of captured image signals g2a constitutes the first captured image signals.

The subject distance information calculation unit 11A calculates the first subject distance information for each of the 35 AF areas 53 based on the plurality of captured image signals g2a acquired in step S9a, and stores the calculated first subject distance information in the RAM (step S10a).

Specifically, the subject distance information calculation unit 11A analyzes each of the plurality of captured image signals g2a acquired in step S9a into captured image signals corresponding to each of the 35 AF areas 53. Accordingly, a plurality of decomposed captured image signals is acquired for each of the 35 AF areas 53.

The subject distance information calculation unit 11A calculates the AF evaluation values from the plurality of decomposed captured image signals corresponding to an arbitrary AF area 53, and determines the position of the focus lens in a case where the decomposed captured image signal as the calculation source of the maximum AF evaluation value among the calculated AF evaluation values is acquired, as a temporary focusing position.

The subject distance information calculation unit 11A calculates the first subject distance information corresponding to each AF area 53 by converting the temporary focusing position determined for each AF area into the subject distance information.

The processes of step S11 to step S15 are performed after step S10a, and the process of step S16a is performed by the second evaluation unit 11C after the process of step S15.

In step S16a, the second evaluation unit 11C evaluates the AF area 53 having the identification number N based on any one captured image signal g2a of the plurality of captured image signals g2a acquired in step S8a and the partial image signal g1 stored in step S7. The process of step S17 is performed after the process of step S16a.

It is preferable that a signal acquired in the focusing state in which blur is less is used as the captured image signal selected among the plurality of captured image signals g2a in step S16a. By doing this, it is possible to increase the accuracy of the evaluation of the AF area 53 using the second evaluation unit 11C.

Specifically, the second evaluation unit 11C selects the captured image signal acquired in a state in which the focus lens is present in the temporary focusing position determined for the currently selected AF area 53, among the plurality of captured image signals g2a acquired in step S8a.

The current selected AF area 53 is an area in which the subject desired to be most recently in focus is formed. Thus, there is a high possibility that the captured image signals g2a acquired in a state in which the focus lens is present in the temporary focusing position acquired for the AF area 53 will be in a burl state with the same degree as that of the partial image signal g1. Accordingly, it is possible to perform the evaluation using the second evaluation unit 11C with high accuracy.

In a case where the determination result in step S17 is YES, the focusing position determination unit 11D selects the AF area 53 to be used in the determination of the focusing position according to the contents illustrated in FIG. 9 based on the evaluation result in step S12 and the evaluation result in step S16a (step S19a). The process returns to step S2a after step S19a.

As in the modification example, in a case where the focusing control is performed in the contrast AF method, the evaluation is performed for each AF area 53 by the second evaluation unit 11C after the first subject distance information is calculated in step S10a, and thus, it is possible to acquire the captured image signals g2a acquired in a state in which the blur is less in the process of step S16a. Thus, it is possible to improve the accuracy of the evaluation for each AF area 53 using the second evaluation unit 11C.

In FIG. 8, the imaging performed in step S8 constitutes the first imaging, and the imaging performed in step S6 constitutes the second imaging. In FIG. 14, the imaging performed in step S8a constitutes the first imaging, and the imaging performed in step S6 constitutes the second imaging.

Hereinafter, a configuration of a smartphone as the imaging device will be described.

Figure 15:
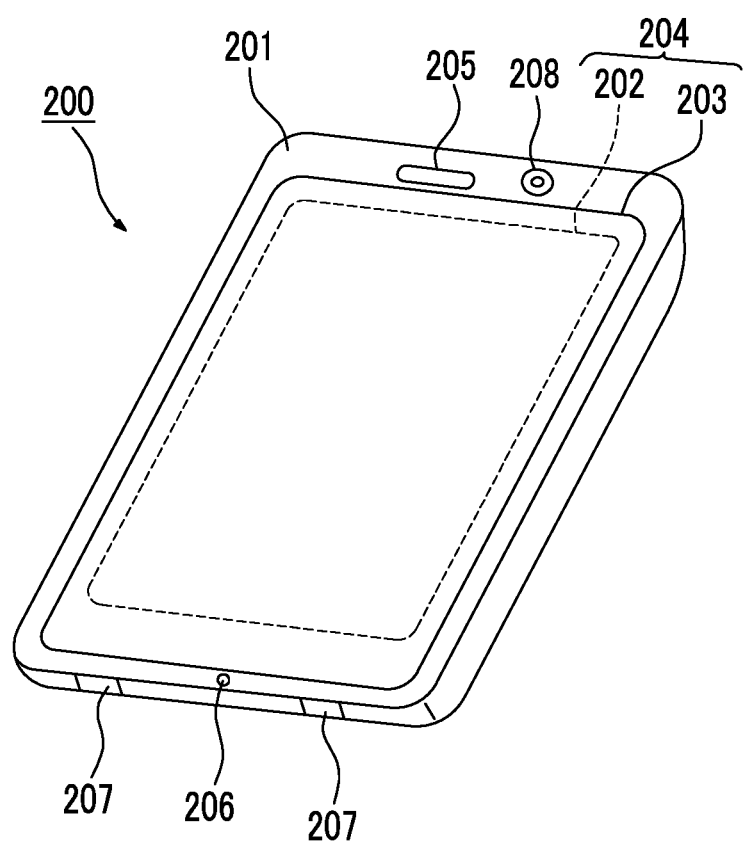
FIG. 15 is a diagram for describing a smartphone as the imaging device.

FIG. 15 shows the appearance of a smartphone 200 which is an embodiment of an imaging device of the invention. The smartphone 200 shown in FIG. 15 has a flat plate-shaped housing 201, and includes a display input unit 204 in which a display panel 202 as a display unit on one surface of the housing 201 and an operation panel 203 as an input unit are integrated. The housing 201 includes a speaker 205, a microphone 206, an operating unit 207, and a camera unit 208. The configuration of the housing 201 is not limited thereto, and for example, a configuration in which the display unit and the input unit are independent from each other may be employed, or a configuration having a folding structure or a slide mechanism may be employed.

Figure 16:
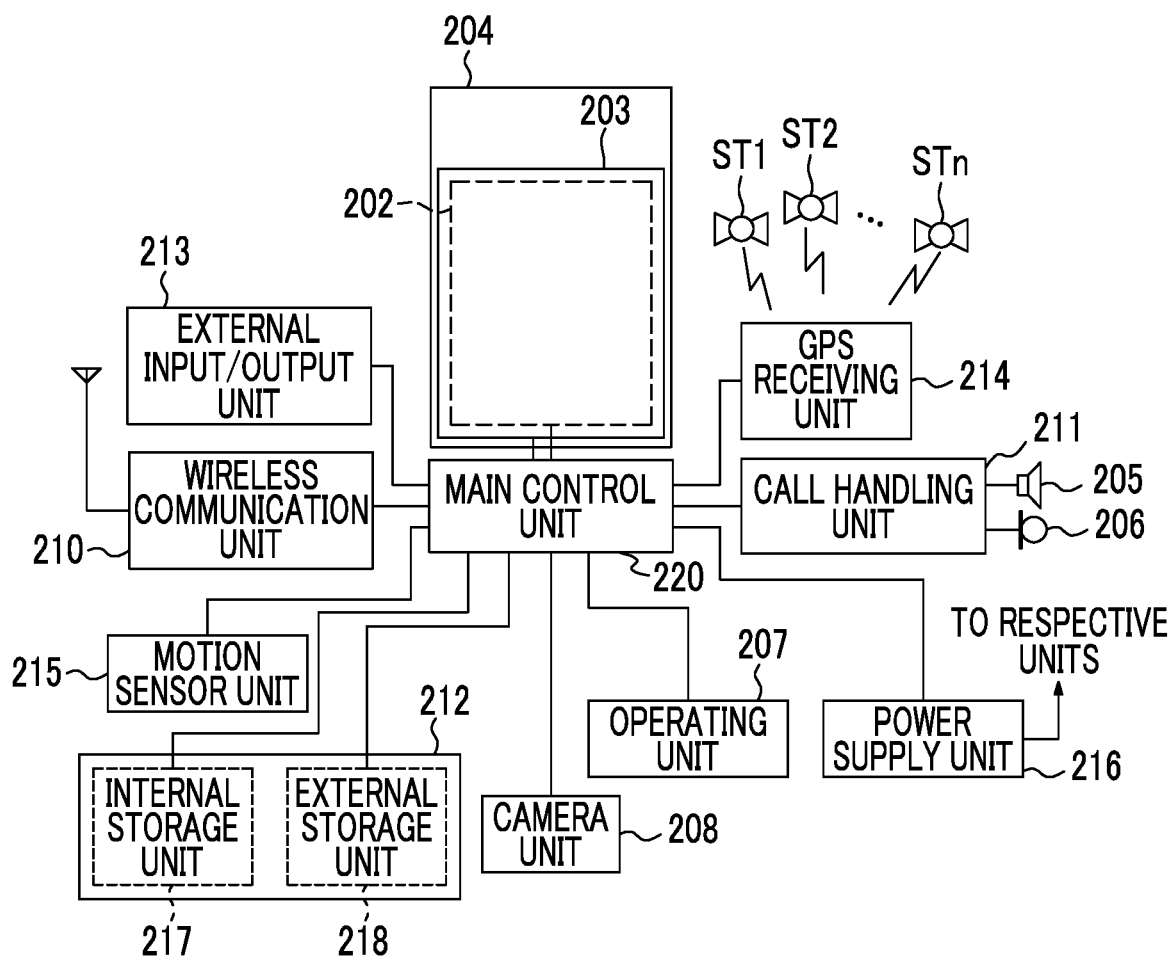
FIG. 16 is an internal block diagram of the smartphone of FIG. 15.

FIG. 16 is a block diagram showing the configuration of the smartphone 200 shown in FIG. 15. As shown in FIG. 16, principal components of the smartphone include a wireless communication unit 210, a display input unit 204, a call handling unit 211, an operating unit 207, a camera unit 208, a storage unit 212, an external input/output unit 213, a global positioning system (GPS) receiving unit 214, a motion sensor unit 215, a power supply unit 216, and a main control unit 220. Principal functions of the smartphone 200 include a wireless communication function of performing mobile wireless communication through a base station device BS (not shown) through a mobile communication network NW (not shown).

The wireless communication unit 210 performs wireless communication with a base station device BS in the mobile communication network NW according to an instruction of the main control unit 220. With the use of the wireless communication, transmission and reception of various kinds of file data, such as voice data and image data, and electronic mail data, or reception of Web data, streaming data, or the like are performed.

The display input unit 204 is a so-called touch panel which displays images (still images and moving images) or character information, or the like to visually transfer information to the user and detects a user's operation on the displayed information under the control of the main control unit 220, and includes the display panel 202 and the operation panel 203.

The display panel 202 uses a liquid crystal display (LCD), an organic electro-luminescence display (OELD), or the like, as a display device.

The operation panel 203 is a device which is placed such that an image displayed on a display surface of the display panel 202 is visible, and detects one or a plurality of coordinates of an operation with a user's finger or a stylus. If the device is operated with the user's finger or the stylus, a detection signal due to the operation is output to the main control unit 220. Next, the main control unit 220 detects an operation position (coordinates) on the display panel 202 based on the received detection signal.

As shown in FIG. 16, although the display panel 202 and the operation panel 203 of the smartphone 200 illustrated as an embodiment of an imaging device of the invention are integrated to constitute the display input unit 204, the operation panel 203 is arranged to completely cover the display panel 202.

In a case where this arrangement is employed, the operation panel 203 may include a function of detecting a user's operation even in a region outside the display panel 202. In other words, the operation panel 203 may include a detection region (hereinafter, referred to as a display region) for a superimposed portion overlapping the display panel 202 and a detection region (hereinafter, referred to as a non-display region) for an outer edge portion not overlapping the display panel 202 other than the display region.

Although the size of the display region may completely match the size of the display panel 202, it is not necessary to match both of the size of the display region and the size of the display panel. The operation panel 203 may include two sensitive regions including an outer edge portion and an inner portion other than the outer edge portion. The width of the outer edge portion is appropriately designed according to the size of the housing 201 or the like.

As a position detection system which is employed in the operation panel 203, a matrix switching system, a resistive film system, a surface acoustic wave system, an infrared system, an electromagnetic induction system, an electrostatic capacitance system, and the like are exemplified, and any system can be employed.

The call handling unit 211 includes the speaker 205 and the microphone 206, converts voice of the user input through the microphone 206 to voice data processable in the main control unit 220 and outputs voice data to the main control unit 220, or decodes voice data received by the wireless communication unit 210 or the external input/output unit 213 and outputs voice from the speaker 205.

As shown in FIG. 15, for example, the speaker 205 can be mounted on the same surface as the surface on which the display input unit 204 is provided, and the microphone 206 can be mounted on the side surface of the housing 201.

The operating unit 207 is a hardware key using a key switch or the like, and receives an instruction from the user. For example, as shown in FIG. 15, the operating unit 207 is a push button-type switch which is mounted on the side surface of the housing 201 of the smartphone 200, and is turned on by being depressed with a finger or the like and is turned off by restoration force of the panel or the like in a case where the finger is released.

The storage unit 212 stores a control program or control data of the main control unit 220, application software, address data in association with the name, telephone number, and the like of a communication partner, data of transmitted and received electronic mail, Web data downloaded by Web browsing, and downloaded content data, and temporarily stores streaming data or the like. The storage unit 212 is constituted of an internal storage unit 217 embedded in the smartphone and an external storage unit 218 having a slot for a detachable external memory.

The internal storage unit 217 and the external storage unit 218 constituting the storage unit 212 are realized using a memory (for example, a microSD (Registered Trademark) memory or the like), such as a flash memory type, a hard disk type, a multimedia card micro type, or a card type, or a storage medium, such as a random access memory (RAM) or a read only memory (ROM).

The external input/output unit 213 plays a role of an interface with all external devices connected to the smartphone 200, and is provided for direct or indirect connection to other external devices through communication or the like (for example, universal serial bus (USB), IEEE 1394, or the like), or a network (for example, the Internet, wireless LAN, Bluetooth (Registered trademark), radio frequency identification (RFID), infrared communication (Infrared Data Association: IrDA) (Registered Trademark), Ultra Wideband (UWB) (Registered Trademark), ZigBee (Registered Trademark), or the like).

The external devices connected to the smartphone 200 are, for example, a wired or wireless headset, a wired or wireless external charger, a wired or wireless data port, a memory card connected through a card socket, a subscriber identity module (SIM) card, a user identity module (UIM) card, an external audio-video device connected through an audio-video input/output (I/O) terminal, an external audio-video device connected in a wireless manner, a smartphone connected in a wired or wireless manner, a personal computer connected in a wired or wireless manner, an earphone connected in a wired or wireless manner, and the like. The external input/output unit 213 can transfer data transmitted from the external devices to the respective components in the smartphone 200 or can transmit data in the smartphone 200 to the external devices.

The GPS receiving unit 214 receives GPS signals transmitted from GPS satellites ST1 to STn according to an instruction of the main control unit 220, executes positioning calculation processing based on a plurality of received GPS signals, and detects the position of the smartphone 200 having latitude, longitude, and altitude. In a case where positional information can be acquired from the wireless communication unit 210 or the external input/output unit 213 (for example, a wireless LAN), the GPS receiving unit 214 can detect the position using the positional information.

The motion sensor unit 215 includes, for example, a three-axis acceleration sensor or the like, and detects physical motion of the smartphone 200 according to an instruction of the main control unit 220. The moving direction or acceleration of the smartphone 200 is detected by detecting physical motion of the smartphone 200. The detection result is output to the main control unit 220.

The power supply unit 216 supplies electric power stored in a battery (not shown) to the respective units of the smartphone 200 according to an instruction of the main control unit 220.

The main control unit 220 includes a microprocessor, operates according to the control program or control data stored in the storage unit 212, and integrally controls the respective units of the smartphone 200. The main control unit 220 has a mobile communication control function of controlling respective units of a communication system in order to perform voice communication or data communication through the wireless communication unit 210, and an application processing function.

The application processing function is realized by the main control unit 220 operating according to application software stored in the storage unit 212. The application processing function is, for example, an infrared communication function of controlling the external input/output unit 213 to perform data communication with a device facing the smartphone 200, an electronic mail function of transmitting and receiving electronic mail, a Web browsing function of browsing Web pages, or the like.

The main control unit 220 has an image processing function of displaying video on the display input unit 204, or the like based on image data (still image or moving image data), such as received data or downloaded streaming data. The image processing function refers to a function of the main control unit 220 decoding image data, performing image processing on the decoding result, and displaying an image on the display input unit 204.

The main control unit 220 executes display control on the display panel 202 and operation detection control for detecting a user's operation through the operating unit 207 and the operation panel 203. With the execution of the display control, the main control unit 220 displays an icon for activating application software or a software key, such as a scroll bar, or displays a window for creating electronic mail.

The scroll bar refers to a software key for receiving an instruction to move a display portion of an image which is too large to fit into the display region of the display panel 202.

With the execution of the operation detection control, the main control unit 220 detects a user's operation through the operating unit 207, receives an operation on the icon or an input of a character string in an entry column of the window through the operation panel 203, or receives a scroll request of a display image through the scroll bar.

In addition, with the execution of the operation detection control, the main control unit 220 has a touch panel control function of determining whether an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main control unit 220 may detect a gesture operation on the operation panel 203 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 208 includes the configuration other than the external memory control unit 20, the recording medium 21, the display control unit 22, the display unit 23, and the operating unit 14 in the digital camera shown in FIG. 1.

Captured image data generated by the camera unit 208 can be recorded in the storage unit 212 or can be output through the input/output unit 213 or the wireless communication unit 210.

In the smartphone 200 shown in FIG. 9, although the camera unit 208 is mounted on the same surface as the display input unit 204, the mounting position of the camera unit 208 is not limited thereto, and the camera unit 208 may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS receiving unit 214 detects the position, the position may be detected with reference to an image from the camera unit 208. In addition, the optical axis direction of the camera unit 208 of the smartphone 200 can be determined or a current use environment may be determined with reference to an image from the camera unit 208 without using the three-axis acceleration sensor or in combination with the three-axis acceleration sensor. Of course, an image from the camera unit 208 may be used in application software.

In addition, image data of a still image or a moving image may be attached with positional information acquired by the GPS receiving unit 214, voice information (which may be converted to text information through voice-text conversion by the main control unit or the like) acquired by the microphone 206, posture information acquired by the motion sensor unit 215, or the like and can be recorded in the storage unit 212, or may be output through the input/output unit 213 or the wireless communication unit 210.

In the smartphone 200 having the above-described configuration, it is also possible to perform the subject tracking AF with high accuracy.

As described above, the following matters are disclosed in this specification.

Disclosed is a focusing control device comprising a focusing position determination unit that determines a focusing position of a focus lens based on captured image signals acquired through imaging using a setting area selected among a plurality of setting areas set for an imaging surface of an imaging element that images a subject through an imaging optical system including the focus lens capable of moving in an optical axis direction, a subject distance information calculation unit that calculates first subject distance information of the subject formed in the setting area for each of the plurality of setting areas based on first captured image signals acquired by imaging the subject using the imaging element, a first evaluation unit that evaluates each of the plurality of setting areas based on second subject distance information in a focusing state at the time of second imaging performed earlier than time when first imaging for acquiring the first captured image signals is performed and the first subject distance information for each of the plurality of setting areas calculated by the subject distance information calculation unit, and a second evaluation unit that evaluates each of the plurality of setting areas based on the first captured image signal and a partial image signal which is acquired through imaging using a first setting area used in determination of the focusing position of the focus lens at the time of the second imaging, among second captured image signals acquired through the second imaging. The focusing position determination unit selects a setting area to be used in the determination of the focusing position, among the plurality of setting areas, based on an evaluation result using the first evaluation unit and an evaluation result using the second evaluation unit.

In the disclosed focusing control device, the first evaluation unit evaluates setting areas in which a first degree of similarity between the first subject distance information and the second subject distance information is equal to or greater than a first threshold value, as setting areas in which an evaluation value is equal to or greater than an evaluation threshold value, and the second evaluation unit evaluates setting areas corresponding to portions of which a second degree of similarity with the partial image signal is equal to or greater than a second threshold value, among portions corresponding to the plurality of setting areas among the first captured image signals, as the setting areas in which the evaluation value is equal to or greater than the evaluation threshold value.

In the disclosed focusing control device, the focusing position determination unit selects an overlapped area of the setting areas for which the first evaluation unit evaluates that the evaluation value is equal to or greater than the evaluation threshold value and the setting areas for which the second evaluation unit evaluates that the evaluation value is equal to or greater than the evaluation threshold value, as the setting area to be used in the determination of the focusing position.

In the disclosed focusing control device, the focusing position determination unit selects the setting area to be used in the determination of the focusing position among the plurality of setting areas, based on the number and positions of setting areas for which the first evaluation unit evaluates that the evaluation value is equal to or greater than the evaluation threshold value and the number and positions of setting areas for which the first evaluation unit evaluates that the evaluation value is equal to or greater than the evaluation threshold value in the past in a case where there is no overlapped area of the setting areas in which the first evaluation unit evaluates that the evaluation value is equal to or greater than the evaluation threshold value and the setting areas in which the second evaluation unit evaluates that the evaluation value is equal to or greater than the evaluation threshold value.

In the disclosed focusing control device, the subject distance information calculation unit calculates the first subject distance information by acquiring the plurality of captured image signals acquired by imaging the subject for each of positions of the focus lens using the imaging element, as the first captured image signals, while moving the focus lens in the optical axis direction, performing a process of determining a temporary focusing position of the focus lens for each of the plurality of setting areas based on signals of the first captured image signals corresponding to the plurality of setting areas, and converting the temporary focusing position determined for each of the plurality of setting areas into the subject distance information, and the second evaluation unit evaluates each of the plurality of setting areas based on the partial image signal and any one captured image signal among the plurality of captured image signals constituting the first captured image signals after the first subject distance information is calculated.

In the disclosed focusing control device, the second evaluation unit evaluates each of the plurality of setting areas based on the partial image signal and captured image signals acquired in a state in which the focus lens is present in the temporary focusing position determined for the setting area selected for determining the focusing position of the focus lens at the time of the second imaging, among the plurality of captured image signals.

In the disclosed focusing control device, a plurality of first signal detection sections that receives one of a pair of luminous fluxes passing through different portions arranged in one direction of a pupil region of the imaging optical system and detects signals corresponding to light reception amounts, and a plurality of second signal detection sections that receives the other one of the pair of luminous fluxes and detects signals corresponding to light reception amounts are formed on the imaging surface of the imaging element, and the subject distance information calculation unit calculates the first subject distance information for each of the plurality of setting areas based on a result of a correlation operation of the signals detected by the plurality of first signal detection sections and the signals detected by the plurality of second signal detection sections which are included in the first captured image signals.

Disclosed is an imaging device comprising an imaging element that images a subject through an imaging optical system including a focus lens capable of moving in an optical axis direction, and the focusing control device.

Disclosed is a focusing control method comprising a focusing position determination step of determining a focusing position of a focus lens based on captured image signals acquired through imaging using a setting area selected among a plurality of setting areas set for an imaging surface of an imaging element that images a subject through an imaging optical system including the focus lens capable of moving in an optical axis direction, a subject distance information calculation step of calculating first subject distance information of the subject formed in the setting area for each of the plurality of setting areas based on first captured image signals acquired by the imaging element that images the subject, a first evaluation step of evaluating each of the plurality of setting areas based on second subject distance information in a focusing state at the time of second imaging performed earlier than time when first imaging for acquiring the first captured image signals is performed and the first subject distance information for each of the plurality of setting areas calculated in the subject distance information calculation step, and a second evaluation step of evaluating each of the plurality of setting areas based on the first captured image signal and a partial image signal which is acquired through imaging using a first setting area used in determination of the focusing position of the focus lens at the time of the second imaging, among second captured image data acquired through the second imaging. In the focusing position determination step, a setting area to be used in the determination of the focusing position is selected among the plurality of setting areas based on an evaluation result in the first evaluation step and an evaluation result in the second evaluation step.

In the disclosed focusing control method, in the first evaluation step, setting areas in which a first degree of similarity between the first subject distance information and the second subject distance information is equal to or greater than a first threshold value are evaluated as setting areas in which an evaluation value is equal to or greater than an evaluation threshold value, and in the second evaluation step, setting areas corresponding to portions of which a second degree of similarity with the partial image signal is equal to or greater than a second threshold value, among portions corresponding to the plurality of setting areas among the first captured image signals are evaluated as the setting areas in which the evaluation value is equal to or greater than the evaluation threshold value.

In the disclosed focusing control method, in the focusing position determination step, an overlapped area of the setting areas for which it is evaluated that the evaluation value is equal to or greater than the evaluation threshold value in the first evaluation step and the setting areas for which it is evaluated that the evaluation value is equal to or greater than the evaluation threshold value in the second evaluation step is selected as the setting area to be used in the determination of the focusing position.

In the disclosed focusing control method, in the focusing position determination step, the setting area to be used in the determination of the focusing position among the plurality of setting areas is selected based on the number and positions of setting areas for which it is evaluated that the evaluation value is equal to or greater than the evaluation threshold value in the first evaluation step and the number and positions of setting areas for which it is evaluated that the evaluation value is equal to or greater than the evaluation threshold value in the past in the first evaluation step in a case where there is no overlapped area of the setting areas in which it is evaluated that the evaluation value is equal to or greater than the evaluation threshold value in the first evaluation step and the setting areas in which it is evaluated that the evaluation value is equal to or greater than the evaluation threshold value in the second evaluation step.

In the disclosed focusing control method, in the subject distance information calculation step, the first subject distance information is calculated by acquiring the plurality of captured image signals acquired by imaging the subject for each of positions of the focus lens using the imaging element, as the first captured image signals, while moving the focus lens in the optical axis direction, performing a process of determining a temporary focusing position of the focus lens for each of the plurality of setting areas based on signals of the first captured image signals corresponding to the plurality of setting areas, and converting the temporary focusing position determined for each of the plurality of setting areas into the subject distance information, and in the second evaluation step, each of the plurality of setting areas is evaluated based on the partial image signal and any one captured image signal among the plurality of captured image signals constituting the first captured image signals after the first subject distance information is calculated.

In the disclosed focusing control method, in the second evaluation step, each of the plurality of setting areas is evaluated based on the partial image signal and captured image signals acquired in a state in which the focus lens is present in the temporary focusing position determined for the setting area selected for determining the focusing position of the focus lens at the time of the second imaging, among the plurality of captured image signals.

In the disclosed focusing control method, a plurality of first signal detection sections that receives one of a pair of luminous fluxes passing through different portions arranged in one direction of a pupil region of the imaging optical system and detects signals corresponding to light reception amounts, and a plurality of second signal detection sections that receives the other one of the pair of luminous fluxes and detects signals corresponding to light reception amounts are formed on the imaging surface of the imaging element, and in the subject distance information calculation step, the first subject distance information is calculated for each of the plurality of setting areas based on a result of a correlation operation of the signals detected by the plurality of first signal detection sections and the signals detected by the plurality of second signal detection sections which are included in the first captured image signals.

Disclosed is a focusing control program causing a computer to perform a focusing position determination step of determining a focusing position of a focus lens based on captured image signals acquired through imaging using a setting area selected among a plurality of setting areas set for an imaging surface of an imaging element that images a subject through an imaging optical system including the focus lens capable of moving in an optical axis direction, a subject distance information calculation step of calculating first subject distance information of the subject formed in the setting area for each of the plurality of setting areas based on first captured image signals acquired by the imaging element that images the subject, a first evaluation step of evaluating each of the plurality of setting areas based on second subject distance information in a focusing state at the time of second imaging performed earlier than time when first imaging for acquiring the first captured image signals is performed and the first subject distance information for each of the plurality of setting areas calculated in the subject distance information calculation step, and a second evaluation step of evaluating each of the plurality of setting areas based on the first captured image signal and a partial image signal which is acquired through imaging using a first setting area used in determination of the focusing position of the focus lens at the time of the second imaging, among second captured image data acquired through the second imaging. In the focusing position determination step, a setting area to be used in the determination of the focusing position is selected among the plurality of setting areas based on an evaluation result in the first evaluation step and an evaluation result in the second evaluation step.

The invention is applied to a digital camera, or the like, thereby achieving high convenience and effectiveness.

Although the invention has been described above by a specific embodiment, the invention is not limited to the embodiment, and various modifications may be made without departing from the technical spirit of the invention disclosed herein.

This application is based on Japanese Patent Application (JP2015-249617), filed Dec. 22, 2015, the content of which is incorporated herein.

EXPLANATION OF REFERENCES

1: imaging lens
2: stop
4: lens control unit
5: imaging element
6: analog signal processing unit
7: analog-to-digital conversion circuit
8: lens drive unit
9: stop drive unit
10: imaging element drive unit
11: system control unit
11A: subject distance information calculation unit
11B: first evaluation unit
11C: second evaluation unit
11D: focusing position determination unit
11E: lens driving control unit
14: operating unit
15: memory control unit
16: main memory
17: digital signal processing unit
20: external memory control unit
21: recording medium
22: display control unit
23: display unit
24: control bus
25: data bus
40: lens device
50: imaging surface
51: pixel
52, 52A, 52B: phase difference detection pixel
53: AF area
c: opening
H1: person
H2: object
200: smartphone
201: housing
202: display panel
203: operation panel
204: display input unit
205: speaker
206: microphone
207: operating unit
208: camera unit
210: wireless communication unit
211: call handling unit
212: storage unit
213: external input/output unit
214: GPS receiving unit
215: motion sensor unit
216: power supply unit
217: internal storage unit
218: external storage unit
220: main control unit
ST1 to STn: GPS satellite

What is claimed is:

1. A focusing control device comprising a processor and a memory, wherein the processor is configured to execute commands stored in the memory to function as:

a focusing position determination unit that determines a focusing position of a focus lens based on captured image signals acquired through imaging using a setting area selected among a plurality of setting areas set for an imaging surface of an imaging element that images a subject through an imaging optical system including the focus lens capable of moving in an optical axis direction;

a subject distance information calculation unit that calculates first subject distance information of the subject formed in the setting area for each of the plurality of setting areas based on first captured image signals acquired by imaging the subject using the imaging element;

a first evaluation unit that evaluates each of the plurality of setting areas based on second subject distance information in a focusing state at a time of second imaging performed earlier than a time when first imaging for acquiring the first captured image signals is performed and the first subject distance information for each of the plurality of setting areas calculated by the subject distance information calculation unit; and a second evaluation unit that evaluates each of the plurality of setting areas based on the first captured image signal and a partial image signal which is acquired through imaging using a first setting area used in determination of the focusing position of the focus lens at the time of the second imaging, among second captured image signals acquired through the second imaging, wherein the first evaluation unit evaluates setting areas in which a first degree of similarity between the first subject distance information and the second subject distance information is equal to or greater than a first threshold value, as setting areas in which an evaluation value is equal to or greater than an evaluation threshold value, the second evaluation unit evaluates setting areas corresponding to portions of which a second degree of similarity with the partial image signal is equal to or greater than a second threshold value, among portions corresponding to the plurality of setting areas among the first captured image signals, as the setting areas in which the evaluation value is equal to or greater than the evaluation threshold value, the focusing position determination unit selects an overlapped area of the setting areas for which the first evaluation unit evaluates that the evaluation value is equal to or greater than the evaluation threshold value and the setting areas for which the second evaluation unit evaluates that the evaluation value is equal to or greater than the evaluation threshold value, as the setting area to be used in the determination of the focusing position, one of setting areas for which the second evaluation unit evaluates that the evaluation value is equal to or greater than the evaluation threshold value is selected as a setting area to be used in the determination of the focusing position in a case where there is no setting area for which the first evaluation unit evaluates that the evaluation value is equal to or greater than the evaluation threshold value, and there is a setting area for which the second evaluation unit evaluates that the evaluation value is equal to or greater than the evaluation threshold value, and one of setting areas for which the first evaluation unit evaluates that the evaluation value is equal to or greater than the evaluation threshold value is selected as a setting area to be used in the determination of the focusing position, based on number and positions of setting areas for which the first evaluation unit evaluates that the evaluation value is equal to or greater than the evaluation threshold value and number and positions of setting areas for which the first evaluation unit evaluates that the evaluation value is equal to or greater than the evaluation threshold value in past, in a case where there is a setting area for which the first evaluation unit evaluates that the evaluation value is equal to or greater than the evaluation threshold value, and there is no setting area for which the second evaluation unit evaluates that the evaluation value is equal to or greater than the evaluation threshold value, or in a case where the setting area for which the first evaluation unit evaluates that the evaluation value is equal to or greater than the evaluation threshold value is different from the setting area for which the second evaluation unit evaluates that the evaluation value is equal to or greater than the evaluation threshold value.

2. The focusing control device according to claim 1, wherein the subject distance information calculation unit calculates the first subject distance information by acquiring the plurality of captured image signals acquired by imaging the subject for each of positions of the focus lens using the imaging element, as the first captured image signals, while moving the focus lens in the optical axis direction, performing a process of determining a temporary focusing position of the focus lens for each of the plurality of setting areas based on signals of the first captured image signals corresponding to the plurality of setting areas, and converting the temporary focusing position determined for each of the plurality of setting areas into the subject distance information, and the second evaluation unit evaluates each of the plurality of setting areas based on the partial image signal and one captured image signal among the plurality of captured image signals constituting the first captured image signals after the first subject distance information is calculated.

3. The focusing control device according to claim 2, wherein the second evaluation unit evaluates each of the plurality of setting areas based on the partial image signal and captured image signals acquired in a state in which the focus lens is present in the temporary focusing position determined for the setting area selected for determining the focusing position of the focus lens at the time of the second imaging, among the plurality of captured image signals.

4. The focusing control device according to claim 1, wherein a plurality of first signal detection sections that receives one of a pair of luminous fluxes passing through different portions arranged in one direction of a pupil region of the imaging optical system and detects signals corresponding to light reception amounts, and a plurality of second signal detection sections that receives other one of the pair of luminous fluxes and detects signals corresponding to light reception amounts are formed on the imaging surface of the imaging element, and the subject distance information calculation unit calculates the first subject distance information for each of the plurality of setting areas based on a result of a correlation operation of the signals detected by the plurality of first signal detection sections and the signals detected by the plurality of second signal detection sections which are included in the first captured image signals.

5. An imaging device comprising:

the imaging element that images the subject through the imaging optical system including the focus lens capable of moving in the optical axis direction;

and the focusing control device according to claim 1.

6. A focusing control method comprising:

a focusing position determination step of determining a focusing position of a focus lens based on captured image signals acquired through imaging using a setting area selected among a plurality of setting areas set for an imaging surface of an imaging element that images a subject through an imaging optical system including the focus lens capable of moving in an optical axis direction;

a subject distance information calculation step of calculating first subject distance information of the subject formed in the setting areas for each of the plurality of setting areas based on first captured image signals acquired by the imaging element that images the subject;

a first evaluation step of evaluating each of the plurality of setting areas based on second subject distance information in a focusing state at a time of second imaging performed earlier than a time when first imaging for acquiring the first captured image signals is performed and the first subject distance information for each of the plurality of setting areas calculated in the subject distance information calculation step; and a second evaluation step of evaluating each of the plurality of setting areas based on the first captured image signal and a partial image signal which is acquired through imaging using a first setting area used in determination of the focusing position of the focus lens at the time of the second imaging, among second captured image data acquired through the second imaging, wherein, in the first evaluation step, setting areas in which a first degree of similarity between the first subject distance information and the second subject distance information is equal to or greater than a first threshold value are evaluated as setting areas in which an evaluation value is equal to or greater than an evaluation threshold value, and in the second evaluation step, setting areas corresponding to portions of which a second degree of similarity with the partial image signal is equal to or greater than a second threshold value, among portions corresponding to the plurality of setting areas among the first captured image signals are evaluated as the setting areas in which the evaluation value is equal to or greater than the evaluation threshold value, in the focusing position determination step, an overlapped area of the setting areas for which it is evaluated that the evaluation value is equal to or greater than the evaluation threshold value in the first evaluation step and the setting areas for which it is evaluated that the evaluation value is equal to or greater than the evaluation threshold value in the second evaluation step is selected as the setting area to be used in the determination of the focusing position, one of setting areas for which it is evaluated that the evaluation value is equal to or greater than the evaluation threshold value in the second evaluation step is selected as a setting area to be used in the determination of the focusing position in a case where there is no setting area for which it is evaluated that the evaluation value is equal to or greater than the evaluation threshold value in the first evaluation step, and there is a setting area for which it is evaluated that the evaluation value is equal to or greater than the evaluation threshold value in the second evaluation step, one of setting areas for which it is evaluated that the evaluation value is equal to or greater than the evaluation threshold value in the first evaluation step is selected as a setting area to be used in the determination of the focusing position, based on number and positions of setting areas for which it is evaluated that the evaluation value is equal to or greater than the evaluation threshold value in the first evaluation step and number and positions of setting areas for which it is evaluated that the evaluation value is equal to or greater than the evaluation threshold value in past in the first evaluation step, in a case where there is a setting area for which it is evaluated that the evaluation value is equal to or greater than the evaluation threshold value in the first evaluation step, and there is no setting area for which it is evaluated that the evaluation value is equal to or greater than the evaluation threshold value in the second evaluation step, or in a case where the setting area for which it is evaluated that the evaluation value is equal to or greater than the evaluation threshold value in the first evaluation step is different from the setting area for which it is evaluated that the evaluation value is equal to or greater than the evaluation threshold value in the second evaluation step.

7. The focusing control method according to claim 6, wherein, in the subject distance information calculation step, the first subject distance information is calculated by acquiring the plurality of captured image signals acquired by imaging the subject for each of positions of the focus lens using the imaging element, as the first captured image signals, while moving the focus lens in the optical axis direction, performing a process of determining a temporary focusing position of the focus lens for each of the plurality of setting areas based on signals of the first captured image signals corresponding to the plurality of setting areas, and converting the temporary focusing position determined for each of the plurality of setting areas into the subject distance information, and in the second evaluation step, each of the plurality of setting areas is evaluated based on the partial image signal and one captured image signal among the plurality of captured image signals constituting the first captured image signals after the first subject distance information is calculated.

8. The focusing control method according to claim 7, wherein, in the second evaluation step, each of the plurality of setting areas is evaluated based on the partial image signal and captured image signals acquired in a state in which the focus lens is present in the temporary focusing position determined for the setting area selected for determining the focusing position of the focus lens at the time of the second imaging, among the plurality of captured image signals.

9. The focusing control method according to claim 6, wherein a plurality of first signal detection sections that receives one of a pair of luminous fluxes passing through different portions arranged in one direction of a pupil region of the imaging optical system and detects signals corresponding to light reception amounts, and a plurality of second signal detection sections that receives other one of the pair of luminous fluxes and detects signals corresponding to light reception amounts are formed on the imaging surface of the imaging element, and in the subject distance information calculation step, the first subject distance information is calculated for each of the plurality of setting areas based on a result of a correlation operation of the signals detected by the plurality of first signal detection sections and the signals detected by the plurality of second signal detection sections which are included in the first captured image signals.

10. A non-transitory computer readable medium storing a focusing control program causing a computer to perform:
- a focusing position determination step of determining a focusing position of a focus lens based on captured image signals acquired through imaging using a setting area selected among a plurality of setting areas set for an imaging surface of an imaging element that images a subject through an imaging optical system including the focus lens capable of moving in an optical axis direction;
- a subject distance information calculation step of calculating first subject distance information of the subject formed in the setting areas for each of the plurality of setting areas based on first captured image signals acquired by the imaging element that images the subject;
- a first evaluation step of evaluating each of the plurality of setting areas based on second subject distance information in a focusing state at a time of second imaging performed earlier than a time when first imaging for acquiring the first captured image signals is performed and the first subject distance information for each of the plurality of setting areas calculated in the subject distance information calculation step; and
- a second evaluation step of evaluating each of the plurality of setting areas based on the first captured image signal and a partial image signal which is acquired through imaging using a first setting area used in determination of the focusing position of the focus lens at the time of the second imaging, among second captured image data acquired through the second imaging,
- wherein, in the first evaluation step, setting areas in which a first degree of similarity between the first subject distance information and the second subject distance information is equal to or greater than a first threshold value are evaluated as setting areas in which an evaluation value is equal to or greater than an evaluation threshold value, and
- in the second evaluation step, setting areas corresponding to portions of which a second degree of similarity with the partial image signal is equal to or greater than a second threshold value, among portions corresponding to the plurality of setting areas among the first captured image signals are evaluated as the setting areas in which the evaluation value is equal to or greater than the evaluation threshold value,
- in the focusing position determination step, an overlapped area of the setting areas for which it is evaluated that the evaluation value is equal to or greater than the evaluation threshold value in the first evaluation step and the setting areas for which it is evaluated that the evaluation value is equal to or greater than the evaluation threshold value in the second evaluation step is selected as the setting area to be used in the determination of the focusing position,
- one of setting areas for which it is evaluated that the evaluation value is equal to or greater than the evaluation threshold value in the second evaluation step is selected as a setting area to be used in the determination of the focusing position in a case where there is no setting area for which it is evaluated that the evaluation value is equal to or greater than the evaluation threshold value in the first evaluation step, and there is a setting area for which it is evaluated that the evaluation value is equal to or greater than the evaluation threshold value in the second evaluation step and
- one of setting areas for which it is evaluated that the evaluation value is equal to or greater than the evaluation threshold value in the first evaluation step is selected as a setting area to be used in the determination of the focusing position based on number and positions of setting areas for which it is evaluated that the evaluation value is equal to or greater than the evaluation threshold value in the first evaluation step and number and positions of setting areas for which it is evaluated that the evaluation value is equal to or greater than the evaluation threshold value in past in the first evaluation step, in a case where there is a setting area for which it is evaluated that the evaluation value is equal to or greater than the evaluation threshold value in the first evaluation step, and there is no setting area for which it is evaluated that the evaluation value is equal to or greater than the evaluation threshold value in the second evaluation step, or in a case where the setting area for which it is evaluated that the evaluation value is equal to or greater than the evaluation threshold value in the first evaluation step is different from the setting area for which it is evaluated that the evaluation value is equal to or greater than the evaluation threshold value in the second evaluation step.

* * * * *